United States Patent
Wu et al.

(10) Patent No.: US 10,303,878 B2
(45) Date of Patent: May 28, 2019

(54) METHODS AND APPARATUS FOR AUTOMATIC DETECTION AND ELIMINATION OF FUNCTIONAL HARDWARE TROJANS IN IC DESIGNS

(71) Applicant: Yu-Liang Wu, Hong Kong (CN)

(72) Inventors: Yu-Liang Wu, Hong Kong (CN); Xing Wei, Hong Kong (CN); Yi Diao, Hong Kong (CN)

( * ) Notice: Subject to any disclaimer, the term of this patent is extended or adjusted under 35 U.S.C. 154(b) by 308 days.

(21) Appl. No.: 15/405,329

(22) Filed: Jan. 13, 2017

(65) Prior Publication Data

US 2017/0213026 A1 Jul. 27, 2017

Related U.S. Application Data

(60) Provisional application No. 62/281,738, filed on Jan. 22, 2016.

(51) Int. Cl.
*G06F 21/00* (2013.01)
*G06F 21/56* (2013.01)
*G06F 21/76* (2013.01)
*G06F 17/50* (2006.01)

(52) U.S. Cl.
CPC ............ *G06F 21/568* (2013.01); *G06F 21/76* (2013.01); *G06F 17/505* (2013.01)

(58) Field of Classification Search
CPC .................................................... G06F 21/568
USPC ......................................................... 726/24
See application file for complete search history.

(56) References Cited

U.S. PATENT DOCUMENTS 10,068,091 B1* 9/2018 Aziz ..................... G06F 21/554
2017/0310688 A1* 10/2017 Lecomte .................. G09C 1/00

OTHER PUBLICATIONS

"Reverse Engineering Digital Circuits using Structural and Functional Analysis" by Subramanyan—IEEE Transactions on emerging topics in computing on May 7, 2014.*
W. Jong, H.-T. Wang, C. Hsieh, and K.-Y. Khoo, ICCAD—2012 CAD contest in finding the minimal logic difference or functional eco and benchmark suite: Cad contest, in Proc. International Conference on Computer-Aided Design, 2012.
C.-J. Hsu, W.-H. Lin, H.-T. Wang, F. Lu, and K.-Y. Khoo, ICCAD—2013 CAD contest in technology mapping for macro blocks and benchmark suite, in Proc. International Conference on Computer-Aided Design, 2013.

(Continued)

*Primary Examiner* — Longbit Chai
(74) *Attorney, Agent, or Firm* — Eagle IP Limited; Jacqueline C. Lui

(57) ABSTRACT

A method detects, locates, and masks a hardware Trojan (HT) in an arithmetic circuit to improve circuit security. The method provides a first netlist and a second netlist of the arithmetic circuit, uses reverse engineering to extract 2-input XOR sub circuits, XOR trees, 1-bit adders, 1-bit adder graphs and arithmetic macros from the first netlist and the second netlist to obtain a first plurality of arithmetic macros and a second plurality of arithmetic macros, detects the HT by comparing the first plurality of arithmetic macros with the second plurality of arithmetic macros with functional ECO engine, locates the HT in the second netlist, and improves security of the arithmetic circuit by masking the HT with addition of a patch in the second netlist to obtain a patched netlist.

20 Claims, 16 Drawing Sheets

(56) References Cited

OTHER PUBLICATIONS

C.-J. Hsu, ICCAD—2014 CAD contest in simultaneous CNF encoder optimization with SAT solver setting selection, in Proc. International Conference on Computer-Aided Design, 2014.
X. Wang, M. Tehranipoor, and J. Plusquellic, Detecting malicious inclusions in secure hardware: Challenges and solutions, in Proc. IEEE Intl Workshop Hardware-Oriented Security and Trust (HOST), IEEE CS Press, pp. 15-19, 2008.
T. Mohammad, and F. Koushanfar, A survey of hardware trojan taxonomy and detection, IEEE Design & Test of Computers, vol. 1, pp. 10-25, 2010.
B. M. B. Hopkins, and T. Newby, Hardware trojans-prevention, detection, countermeasures (a literature review), Defence Science and Technology Organisation Edinburgh (Australia) Command Control Communications and Intelligence Div, 2011.
M. Tehranipoor, and F. Koushanfar, Guest Editor's Introduction: Confronting the hardware trustworthiness problem, Guest Editorial, IEEE Design and Test of Computers, Jan. 2010.
J. Zhang, and Q. Xu, On hardware trojan design and implementation at register-transfer level, in Proc. IEEE Intl Workshop Hardware-Oriented Security and Trust (HOST), IEEE CS Press, 2013.
J. Zhang, F. Yuan, and Q. Xu, DeTrust: Defeating hardware trust verification with stealthy implicitly-triggered Hardware Trojans, in Proceedings of the 2014 ACM SIGSAC Conference on Computer and Communications Security, 2014.
P. Subramanyan, N. Tsiskaridze, W. Li, A. Gascn, W. Y. Tan, A. Tiwari, N. Shankar, S. A. Seshia, and S. Malik, Reverse engineering digital circuits using structural and functional analyses, Emerging Topics in Computing, IEEE Transactions on, vol. 2, pp. 63-80, 2014.
A. Waksman, M. Suozzo, and S. Sethumadhavan, FANCI:Identification of stealthy malicious logic using Boolean functional analysis, in ACM Conference on Computer and Communications Security, pp. 697-708, 2013.
J. Zhang, F. Yuan, L. Wei, Z. Sun, and Q. Xu, Veritrust: verification for hardware trust, in Proc. Design Automation Conference, 2013.
J. Rajendran, V. Vedula, and R. Karri, Detecting malicious modifications of data in third-party intellectual property cores, in Proc. Design Automation Conference, 2015.
G. L. Smith, R. J. Bahnsen, and H. Halliwell,Boolean comparison of hardware and flowcharts, IBM Journal of Research and Development, vol. 26, No. 1, pp. 106-116, 1982.
R. Bryant, Graph-based algorithms for Boolean function manipulation, Computers, IEEE Transactions on, vol. C-35, No. 8, pp. 677-691, 1986.
N. Een, and N. Sorensson, An extensible SAT-solver, in Proc. SAT, pp. 502-518, 2003.
E. Goldberg, M. Prasad, and R. Brayton, Using SAT for combinational equivalence checking, in Date'01, pp. 114-121, 2001.
M. Jarvisalo, Equivalence checking hardware multiplier designs, SAT Competition 2007—benchmark description, 2007.
Y. Diao, X. Wei, K.-K. Lam, and Y.-L. Wu, Coupling reverse engineering and SAT to tackle NP-Complete arithmetic circuitry verification in O(# of gates), in Asia and South Pacific Design Automation Conference (ASP-DAC) 2016, 2016.
X. Wei, Y. Diao, T.-K. Lam, and Y.-L. Wu, A universal macro block mapping scheme for arithmetic circuits, in Proceedings of the 2015 Design, Automation & Test in Europe Conference & Exhibition, pp. 1629-1634, EDA Consortium, 2015.
S. Krishnaswamy, H. Ren, N. Modi, and R. Puri, DeltaSyn: An efficient logic difference optimizer for ECO synthesis, in Proc. International Conference on Computer-Aided Design, pp. 789-796, Nov. 2009.
C.-C. Lin, K.-C. Chen, S.-C. Chang, M. Marek-Sadowska, and K.-T. Cheng, Logic synthesis for engineering change, in Proc. Design Automation Conference, pp. 647-652, 1995.
K.-F. Tang, C.-A. Wu, P.-K. Huang, and C.-Y. R. Huang, Interpolation-based incremental ECO synthesis for multi-error logic rectification, in Proc. Design Automation Conference, 2011.
S.-Y. Huang, K.-C. Chen, and K.-T. Cheng, Autofix: A hybrid tool for automatic logic rectification, IEEE Trans. Comput.-Aided Design Integr. Circuits Syst., vol. 18, pp. 1376-1384, Jul. 1999.
C.-W. Chang, and M. Marek-Sadowska, Theory of wire addition and removal in combinational Boolean networks, Microelectronic Engineering, vol. 84, No. 2, pp. 229-243, 2007.
S.-C. Chang, M. Marek-Sadowska, and K.-T. Cheng, Perturb and simplify: Multilevel Boolean network optimizer, IEEE Trans. Comput.-Aided Design Integr. Circuits Syst., vol. 15, pp. 1494-1504, Dec. 1996.
X. Yang, T.-K. Lam, and Y.-L. Wu, ECR: A low complexity generalized error cancellation rewiring scheme, in Proc. Design Automation Conference, pp. 511-516, 2010.
X. Yang, T.-K. Lam, W.-C. Tang, and Y.-L. Wu, Almost every wire is removable: A modeling and solution for removing any circuit wire, in Proc. Design, Automation and Test in Europe Conference and Exhibition, 2012.
W. Kunz, D. Stoffel, and P. R. Menon, Logic optimization and equivalence checking by implication analysis, IEEE Trans. Comput.-Aided Design Integr. Circuits Syst., vol. 16, Nov. 1997.
Y.-L. Wu, and M. Marek-Sadowska, Orthogonal greedy coupling—a new optimization approach to 2-d fpga routing, in Proc. Design Automation Conference, 1995.

\* cited by examiner

```
//8-AND logic
  and g1 (w1, in[0], in[1]);  and g2 (w2, w1, in[2]);
  and g3 (w3, w2, in[3]);     and g4 (w4, w3, in[4]);
  and g5 (w5, w4, in[5]);     and g6 (w6, w5, in[6]);
  and g7 (w7, w6, in[7]);
//8-XOR logic
  xor g11 (w11, in[0], in[1]); xor g12 (w12, w11, in[2]);
  xor g13 (w13, w12, in[3]);   xor g14 (w14, w13, in[4]);
  xor g15 (w15, w14, in[5]);   xor g16 (w16, w15, in[6]);
  xor g17 (w17, w16, in[7]);
//MUX2TO1
  not gnot (wsnot,s)
  and g8 (ws1, s, w7);  and g9 (ws0, wsnot, w17);
  or g10 (out, ws1, ws0) ;
```

Algorithm: Procedure of identifying 1-bit adder graph
Input: gate-level circuit
Output: identified arithmetic macros
1 begin
2  Identify 2-input XOR sub circuits
3  Build XOR trees;
4  Identify carry signals based on XOR trees
5  Identify 1-bit adder sub circuits
6  Build 1-bit adder graph
7  Determine functionality of 1-bit adder graph

1300 ⤴

| Case | #gates | Extracted arithmetics | style | Width |
|---|---|---|---|---|
| Ut1 | 280~1261 | AxC+BxC, (A+B)xC | NB | 6~8 |
| Ut2 | 1197~1994 | AxB | B | 16 |
| Ut3 | 2727~4226 | AxB | B | 32~48 |
| Ut5 | 1025~2261 | (s&(AxB))\|(!s&(CxD)) | NB | 12 |
| Ut7 | 474~2301 | AxB | B&NB | 9~24 |
| Ut8 | 1061~2308 | AxB | B&NB | 23~24 |
| Ut13 | 697~2385 | AxB | B&NB | 11~17 |
| Ut14 | 1402~3442 | AxB | B&NB | 17~19 |
| Ut15 | 851~3023 | AxB | B&NB | 12~17 |
| Ut20 | 584~22600 | AxB, AxB-CxD | B&NB | 10~45 |
| Ut26 | 564~10383 | AxB+C, AxB+CxD+ExF | B&NB | 9~28 |
| Ut32 | 711~2480 | AxB | B&NB | 10~18 |
| Ut36 | 2855~25489 | No arithmetic macro | | |
| Ut41 | 1103~5463 | AxB | B&NB | 13~30 |
| Hid1 | 1157~21467 | AxC+BxC, (A+B)xC | B | 11~32 |
| Hid2 | 563~24520 | AxB | B&NB | 10~64 |
| Hid3 | 462~8672 | A+B+C... | NB | 4~13 |
| Hid4 | 789~5262 | AxB | B&NB | 8~24 |
| Hid5 | 479~5127 | AxB | B&NB | 6~11 |
| Hid6 | 697~2385 | AxB | B&NB | 11~17 |
| Hid7 | 712~2773 | AxB | B&NB | 11~19 |
| Hid8 | 588~22629 | AxB+C, AxB-CxD | B&NB | 10~33 |
| Hid9 | 1004~3327 | AxB | B&NB | 12~16 |
| Hid10 | 18911~61496 | No arithmetic macro | | |

| Case | #g1 | #g2 | Example method 1 | | Example method 2 | |
|---|---|---|---|---|---|---|
| | | | #patch | Time(sec) | #patch | Time(sec) |
| Open01 | 54 | 51 | 0 | 0 | 0 | 0 |
| Open02 | 54 | 51 | 0 | 0 | 0 | 0 |
| Open03 | 206 | 215 | 1 | 18 | 0 | 10 |
| Open04 | 220 | 226 | 0 | 21 | 0 | 10 |
| Open05 | 220 | 226 | 0 | 1 | 0 | 65 |
| Open06 | 272 | 211 | 0 | 24 | 0 | 235 |
| Open07 | 272 | 211 | 20 | 18 | 12 | 278 |
| Open08 | 758 | 519 | 38 | 1 | 55 | 109 |
| Open09 | 223 | 214 | 1 | 2 | 5 | 108 |
| Open10 | 223 | 214 | 11 | 3 | 9 | 154 |
| Open11 | 161 | 193 | 13 | 8 | 12 | 108 |
| Open12 | 161 | 193 | 21 | 2 | 20 | 205 |
| Open13 | 338 | 436 | 8 | 1 | 43 | 99 |
| Open14 | 101 | 65 | 16 | 11 | 16 | 61 |
| Open15 | 770 | 448 | 2 | 0 | 29 | 796 |
| Open16 | 748 | 453 | 1 | 1 | 21 | 626 |
| Hid01 | 26 | 44 | 0 | 0 | 0 | 1 |
| Hid02 | 26 | 44 | 0 | 0 | 0 | 0 |
| Hid03 | 170 | 169 | 2 | 14 | 1 | 16 |
| Hid04 | 176 | 179 | 1 | 17 | 1 | 16 |
| Hid05 | 177 | 175 | 3 | 15 | 3 | 77 |
| Hid06 | 212 | 188 | 10 | 38 | 29 | 293 |
| Hid07 | 210 | 187 | 18 | 32 | 19 | 210 |
| Hid08 | 460 | 379 | 108 | 245 | 107 | 169 |
| Hid09 | 137 | 157 | 1 | 4 | 1 | 79 |
| Hid10 | 137 | 157 | 10 | 34 | 8 | 79 |
| Hid11 | 84 | 93 | 9 | 17 | 10 | 51 |
| Hid12 | 84 | 93 | 18 | 27 | 25 | 126 |
| Hid13 | 637 | 498 | 75 | 19 | 64 | 151 |
| Hid14 | 41 | 35 | 10 | 5 | 10 | 14 |
| Hid15 | 422 | 417 | 35 | 5 | 129 | 519 |
| Hid16 | 442 | 430 | 3 | 2 | 96 | 469 |
| Hid17 | 460 | 379 | 54 | 27 | 111 | 383 |
| Hid18 | 96 | 108 | 55 | 45 | 55 | 126 |
| Hid19 | 188 | 172 | 65 | 48 | Fail | Fail |
| Hid20 | 758 | 519 | 53 | 78 | 117 | 456 |
| Hid21 | 161 | 184 | 73 | 146 | 86 | 498 |
| Hid22 | 224 | 174 | 22 | 28 | Fail | Fail |
| Total | 10109 | 8707 | 757 | 957 | 1094 | 6597 |
| Ratio | | | 61% | 14% | 1 | 1 |

Figure 14

METHODS AND APPARATUS FOR AUTOMATIC DETECTION AND ELIMINATION OF FUNCTIONAL HARDWARE TROJANS IN IC DESIGNS

CLAIM OF BENEFIT TO PRIOR APPLICATION

This application claims benefit to U.S. Provisional Patent Application 62/281,738, entitled "To Detect, Locate, and Mask Hardware Trojans in Digital Circuits", filed on Jan. 22, 2016, the content of which is incorporated herein by reference in its entirety.

FIELD OF THE INVENTION

The present invention generally relates to circuits, and more particularly to methods and apparatus that improve circuit security.

BACKGROUND

Modern circuits (such as integrated circuits (ICs)) are enormously complicated. For example, an average desktop computer chip can have over 1 billion transistors. Due to the complexity and high cost, IC design is often outsourced to a third party that completes the circuit design by using hardware that incorporates software (such as Electronic design automation (EDA) or Computer Aided Design (CAD) tools). Such outsourcing provides opportunities for attackers to take over the designed IC by introducing malicious alterations or hardware Trojans (HTs), which causes serious security concerns especially for security-critical applications such as military applications. A HT can cause malfunction for a circuit into which the HT is embedded or destroy a system incorporating such circuit, lower circuit reliability and leak confidential information.

New methods and apparatus that assist in advancing technological and security needs and industrial applications in circuit technology, IC design, verification, and fabrication processes are desirable.

SUMMARY OF THE INVENTION

One example embodiment provides a method to detect, locate, and mask a functional hardware Trojan (HT) in an arithmetic circuit to improve circuit security over conventional methods. The method provides a first netlist and a second netlist of the arithmetic circuit, extracts arithmetic macros from the first netlist and the second netlist to obtain a first plurality of arithmetic macros and a second plurality of arithmetic macros, detects the HT by comparing the first plurality of arithmetic macros with the second plurality of arithmetic macros, locates the HT in the second netlist, and improves security of the arithmetic circuit by masking the HT with addition of a patch in the second netlist to obtain a patched netlist.

Other example embodiments are discussed herein.

BRIEF DESCRIPTION OF THE DRAWINGS

FIG. 13 shows a table illustrating characteristics of benchmarks in accordance with an example embodiment.

FIG. 14 shows a table illustrating example methods in accordance with an example embodiment.

DETAILED DESCRIPTION

Figure 1:
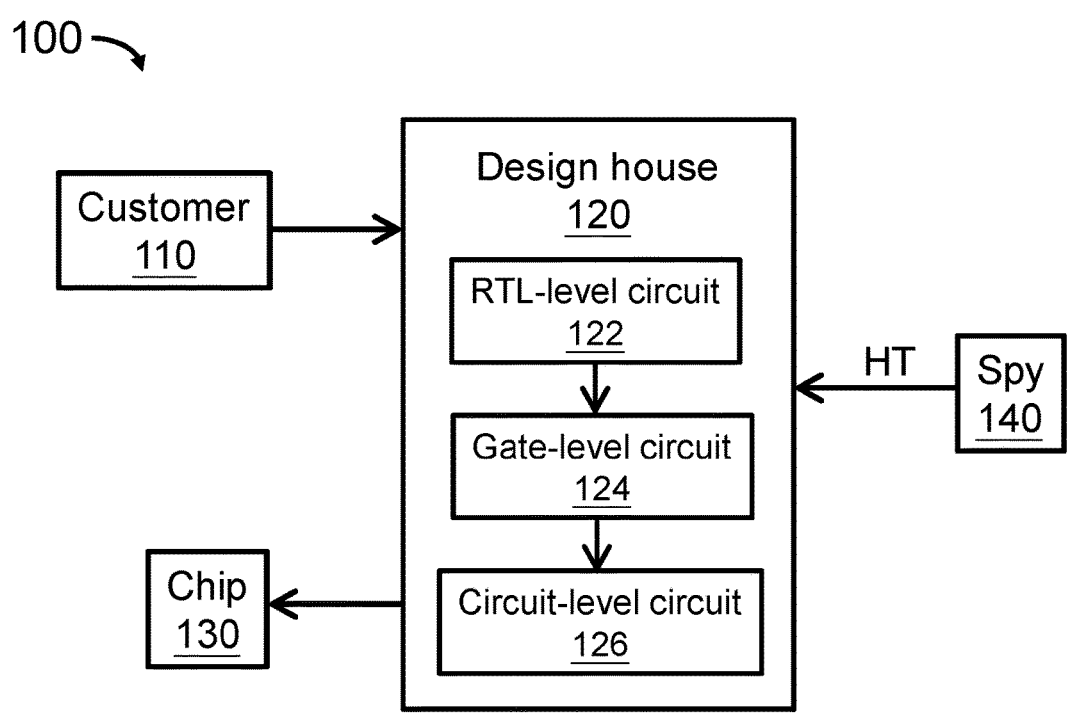
FIG. 1 shows a graph illustrating a scenario of hardware Trojan (HT) implantation during a circuit design process in accordance with an example embodiment.

Example embodiments relate to methods and apparatus that improve circuit security.

Circuit (such as integrated circuits (ICs)) or chip design and fabrication are enormously complicated. A modern IC typically includes millions of miniscule electronic components, such as gates, transistors and diodes (e.g. an average desktop computer chip nowadays can have over 1 billion transistors), which makes it impossible for a person to design such circuits or chips mentally or manually with a pencil and paper. Hardware, such as a computer device or system that incorporates or embeds software (such as Electronic design automation (EDA) or Computer Aided Design (CAD) tools), is generally employed to complete such tasks.

Due to the significantly increased complexity of IC design and fabrication, design is often outsourced by using third party Intellectual Properties (3PIPs) from a vendor. Risks are raised because a hardware Trojan (HT) or bug (e.g. unintended or unauthorized functional hardware insertion, malicious hardware insertion, or unauthorized design modification) can be injected into a circuit by an attacker (such as an untrusted person or dishonest engineer or spy). In addition, it is possible for unexpected functions to be fitted to a circuit or chip by an untrusted foundry and/or distributor.

A HT or bug harms a circuit or chip in many ways. For example, a HT maliciously changes or modifies functionality of a circuit by adding, deleting or modifying circuit's one or more components (such as logic gates, transistors, diodes, etc.). As another example, a HT changes circuit function indirectly by modifying one or more parameters to be fed into a circuit. A HT can disrupt operation of a circuit (such as an IC) or other circuits that couple to the circuit. By way of example, a HT causes an IC to malfunction and/or conduct one or more functions that constitute a security attack. A HT can also be designed or implanted by a spy to retrieve sensitive data or information, or be designed to change a hosting circuitry specification such as delay, power consumption and reliability. For example, a circuit or chip that is specified to function properly for ten years may be reliable for only one year if a HT is implanted or embedded in the circuit. Detecting presence of a HT or bug in a circuit (e.g. arithmetic circuits, such as an IC) and masking or killing such HT is therefore of great importance for industries such as IC design, verification and fabrication, consumer products and military applications etc. Effectiveness and efficiency to detect and remove such HTs or bugs to improve circuit security have great importance in these industries. Undetected HTs in a circuit such as IC can make the circuit worthless or in great danger in terms of a number of aspects such as sensitive information leakage. Low efficiency (such as high runtime or time complexity) in detecting and removing HTs lengthens design cycles and increases time-to-market and jeopardizes profit margins. Furthermore, unsatisfactory efficiency or runtime complexity requires more resource usage (such as memory usage), high performance (such as high processing capacity and speed) for a computer device, and also increases network consumption when data is transmitted over a network to a remote server for processing as an example. Thus, unsatisfactory methods or schemes for HT detection and capture not only jeopardize many industries (such as IC industry and other industries that relate to or depend on IC industry) technologically and economically, but also require costly computer hardware by demanding large resource consumption such as memory usage and high processing speed.

Existing or conventional methods are flawed or have difficulties in detecting and killing HTs in circuits. On one hand, this is because presence of a HT cannot be easily detected. A HT may reside within a testing circuit of a chip to avoid being detected during normal operation and be activated occasionally to carry out malicious operations. Also, the amount of logic gates in a modern IC or chip is too large that exhaustive testing is infeasible. On the other hand, the existing methods have flaws intrinsically in one or more aspects.

For example, many existing methods can only extract simple logic patterns such as gates from a gate-level (GTL) netlist, but cannot handle complex but basic arithmetic blocks such as adders and multipliers. Some existing methods use simulation tools to identify logic gates that have low activation probability, which, however, is inaccurate. Some existing methods employ satisfiability (SAT)-based functional formal verification techniques to detect HTs in circuits, which, however, is incapable in verifying certain arithmetic logics designed in different styles (e.g. Non-Booth versus Booth multipliers). A main reason that the existing SAT-based functional formal verification techniques do not work well is because existing SAT solvers highly rely on successfully locating of internal equivalent points of compared logics. When few internal equivalent points are found, even for a quite small circuit, the solving time or runtime grows exponentially in the worst cases such as when performing comparison between multipliers designed in different styles (e.g. non-Booth versus Booth). Existing SAT solvers also show inability or inefficiency in terms of equivalence checking for circuits (e.g. arithmetic circuits), such as incapability in proving equality between two arithmetic circuits. Furthermore, existing methods fail to detect and locate where the body and boundary of a HT exactly is in a circuit for the chip owner or designer to analyze intending damage of the HT, and do not have a 100% guarantee of catching all HTs in a circuit.

Thus, existing methods or schemes are neither effective nor efficient in detecting and masking or removing a HT in a circuit or arithmetic circuit (such as IC, Application Specific Integrated Circuit (ASIC), and Field-Programmable Gate array (FPGA), Digital Signal Processor (DSP), etc.), which jeopardizes circuit industry by lengthening design cycle and causing serious problems such as circuit failure, short circuit lifetime, and sensitive information leakage or stolen etc. Exiting methods or schemes are also unfavorable from perspective of computer technology because a less efficient process of detecting and masking HTs may be trapped into exponential time (e.g. high time complexity, several tens of hours or days, or even not converging ("forever" runtime that leaves subject problem unsolved)), which demands large resource usage (such as memory usage and network consumption) and costly computer device (such as high processing capacity).

Example embodiments solve the above-stated problems by providing technical solutions in new methods and apparatus that function in unconventional ways to benefit circuit industry and computer industry. Example embodiments benefit circuit (such as IC, ASIC, FPGA, DSP, etc.) industry by preventing (such as detecting, locating, and masking or removing) HTs in a circuit with significantly improved or enhanced effectiveness and efficiency, which, on one hand, increases circuit production (e.g. yield) and lifetime by reducing or preventing circuit failure and malfunctions caused by HTs, and on the other hand, improves circuit security by avoiding sensitive data leakage or by avoiding a circuit or an apparatus or machine that incorporates such circuit being taken over by an attacker or spy. Example embodiments further benefit computer technology by reducing resource consumption (e.g. memory usage and network consumption). Example methods can be executed by a computer device or system with lower hardware requirement to perform circuit design and thus mitigate demand of costly computers with expensive chips, memory and other internal electronic components.

Example embodiments solve the above-stated problems by providing technical solutions in new methods and apparatus that detect one or more functionality differences between circuits (such as between two circuit netlists or macros) that are likely be caused by one or more HTs or bugs, locate or output the differences to correct the HTs or to investigate the tampering intention or purpose, and kill, mask, or remove the HTs by restoring the functionality back to original specification (e.g. golden specification or correct specification). By way of example, example embodiments restore the functionality of a circuit or chip back to original specification with a minimum circuitry change to avoid affecting performance (such as clock and timing, etc.) of the circuit or chip significantly. Example embodiments improve circuit security by blocking intentional or plotted damage to a circuit at an early stage and figuring out a spy source by revealing the HT intention.

By way of example, example embodiments solve the above-stated problems by providing technical solutions with incorporation or combination of reverse engineering, formal verification, functional Engineering Change Order (ECO), and logic rewiring to detect, locate, and mask HTs in a circuit. As an example, example embodiments handle a number of HTs automatically with guarantee of catching 100% of HTs in a circuit.

By way of example, example embodiments solve the above-stated problems by providing technical solutions that couple or combine reverse engineer and formal verification (so-called Complementary Greedy Coupling (CGC) formal verification scheme) to overcome the incapability of SAT solvers in arithmetic verification. Example reverse engineering performs well in verification or proof of equality, and example SAT solvers perform well in verification or proof of inequality. Coupling of reverse engineering and SAT techniques takes advantage of strong points of both reverse engineering and SAT and obtains a combined advantage, which improves HT detection with reduced runtime complexity and increased capability such as capability to tackle NP-complete circuits efficiently. By way of example, example embodiments can formally compare the functionality between a netlist of correct or golden design and an examined design with a HT embedded or implanted.

In an example embodiment, when a logic difference is detected, a functional-ECO technique is applied to locate HTs and a patch or rectification patch logic is inserted or added to mask the HTs. In another example embodiment, a logic rewiring treatment or technique is applied to optimize the patch such that size of the path is minimized, which improves circuit (such as IC) technology because perturbation or interference (such as timing perturbation) to a target circuit or chip is reduced or minimized to increase circuit performance.

By way of example, runtime of example embodiments to detect, locate and mask multiple HTs (no limit on the number of HTs) in an IC with millions of logic gates is within minutes in contrast with hours or days for existing methods.

Example embodiments include a computer system with specific software incorporated, as well as such a computer system embedded in a network. Example computer system solves technical problems raised in circuit industry such as IC industry by executing example methods herein. When executing example methods, example computer system improves hardware performance by reducing resource usage such as memory usage and network consumption.

FIG. 1 shows a graph illustrating a scenario of HT implantation during a circuit design process in accordance with an example embodiment. The graph 100 includes a customer or party 110, a design house 120, a chip 130, and a spy or attacker 140.

By way of example, the customer 110 has a plan or proposed specification (e.g. a microarchitecture and a system-level specification, etc.) for designing a new circuit or chip (e.g. IC, ASIC, FPGA, DSP, etc.) to fit into an industry segment. As an example, the plan or proposed specification is specified using a register transfer level (RTL) specification language (such as Verilog and VHDL). The plan or proposed specification then goes through a long tract of design processes in the design house 120 where a design team processes circuit design with hardware (such as a computer) that incorporates software (such as EDA or CAD tools). The design house 120 belongs to either the customer 110 or a third part to which a design task is outsourced.

By way of example, the design processes performed in the design house 120 include logical synthesis and physical place and route (P&R). As shown in FIG. 1 for example, a RTL-level circuit 122 is synthesized into a gate-level (GTL) circuit 124 that is then synthesized into a circuit-level circuit 126. Based on the completed circuit design, the chip 130 is fabricated or produced.

As shown in FIG. 1, during design phase in the design house 120, the spy 140 (such as an untrusted person or dishonest engineer) maliciously injects or embeds a HT or bug into the circuit or chip. As an example, the HT can be introduced to the circuit at either intermediate stage in the design house 120, such as either design process of the RTL-level circuit 122, the Gate-level circuit 124, and circuit-level circuit 126.

For the customer 110 that concerns circuit security, the HT must be detected and removed effectively and efficiently (e.g. 100% capture within a practical time limit such as polynomial time and even linear time). Otherwise, the spy 140, with the injected HT, can cause malfunctions of the circuit or chip, destroy a system that incorporates the chip, or steal confidential information. The customer 100 is also likely to favor a HT-capture process that is not expensive (e.g. lower requirement for hardware such as a computer device).

Figure 2A:
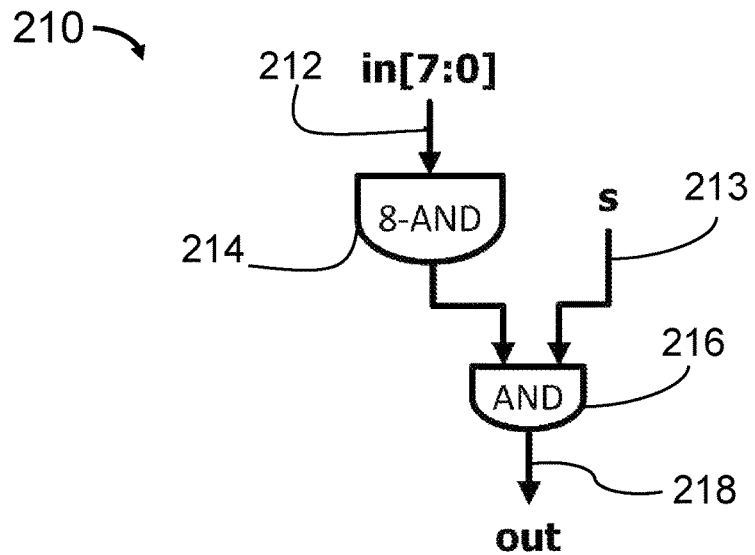
FIG. 2A shows a graph illustrating a gate-level (GTL) circuit in accordance with an example embodiment.

FIGS. 2A-2D show graphs illustrating an HT injection in a gate-level (GTL) circuit in accordance with an example embodiment. For illustrative purpose only, FIG. 2A shows an original GTL circuit 210 that includes a 8-AND gate 214 (herein "8-AND" indicates there are eight inputs for the AND gate) with an input vector 212 (shown as in[7:0] which indicates that there are 8 input signals named in[7], in[6], in[0]) and a AND gate 216. The AND gate 216 has one output 218 (shown as out) and two inputs, one being the output of the 8-AND gate 214 and the other being an input 213 (shown as s).

As an example, the GTL circuit 210 in FIG. 2A is an original netlist of a circuit. By way of example, the input 213 receives from the input 213 a redundant internal signal s that is a stuck-at logic 1 during the normal working mode or normal operation.

Figure 2B:
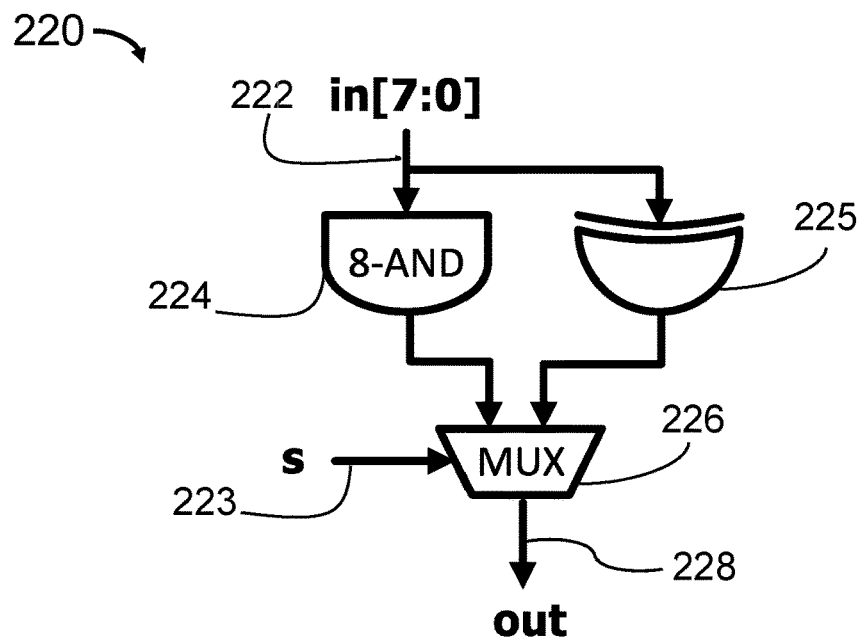
FIG. 2B shows a graph illustrating an HT injection in a GTL circuit in accordance with an example embodiment.

FIG. 2B shows a HT-tempered netlist 220 that includes a malicious logic or HT 225 in accordance with an example embodiment. As a result, the AND gate 216 in FIG. 2A is replaced with or changed into a multiplexer (MUX) 226. The added malicious logic 225 is not triggered on a normal working mode and is thus unable to be tested or detected by simulation using conventional methods such as normal input testing vectors.

Figures 2C, 2D:
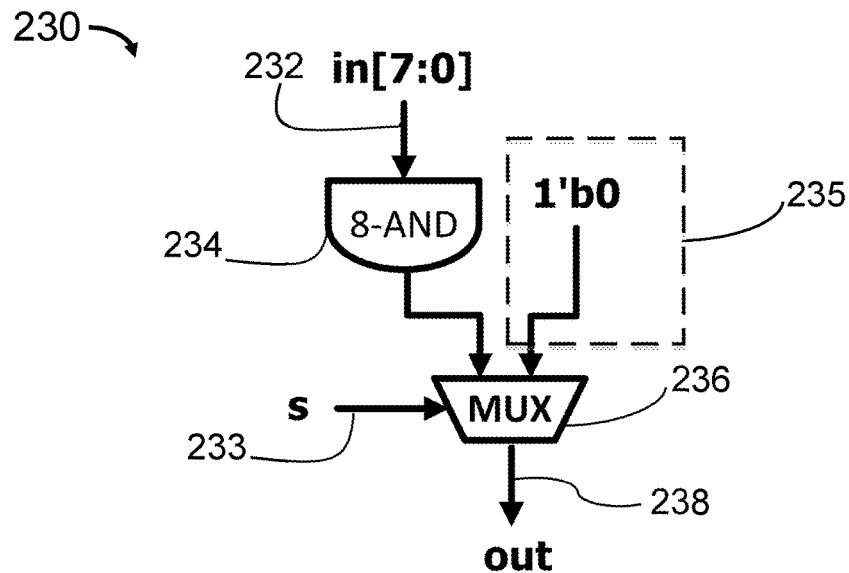
FIG. 2C shows a graph illustrating a patched GTL circuit in accordance with an example embodiment.
FIG. 2D shows a graph illustrating a HT diagnostic report in accordance with an example embodiment.

FIG. 2C shows a patched netlist 230 in accordance with an example embodiment. As shown, the patched netlist 230 includes a patch or patch logic 235 that masks or kills the malicious logic or HT 225. In one example embodiment, the patch 235 is minimized in size to reduce timing perturbation for the target circuit or chip. A target circuit or chip, as an example, is a final product based on the finalized design of a circuit with HTs removed or masked through a circuit varication or checking process.

FIG. 2D shows a HT diagnostic report 240 in accordance with an example embodiment. The HT diagnostic report 240 includes a first part 242 that shows netlist of the patch 235, and a second part 244 that shows the MUX 236 after correction or rectification with the patch 235.

As illustrated in FIGS. 2A-2D, circuit security is improved with example methods by detecting, locating, and masking or killing an inserted or implanted HT or bug in a circuit. The inserted HT is masked by introducing a patch such that the circuit is restored back to a circuit in accordance with original or correct specification.

Figure 3:
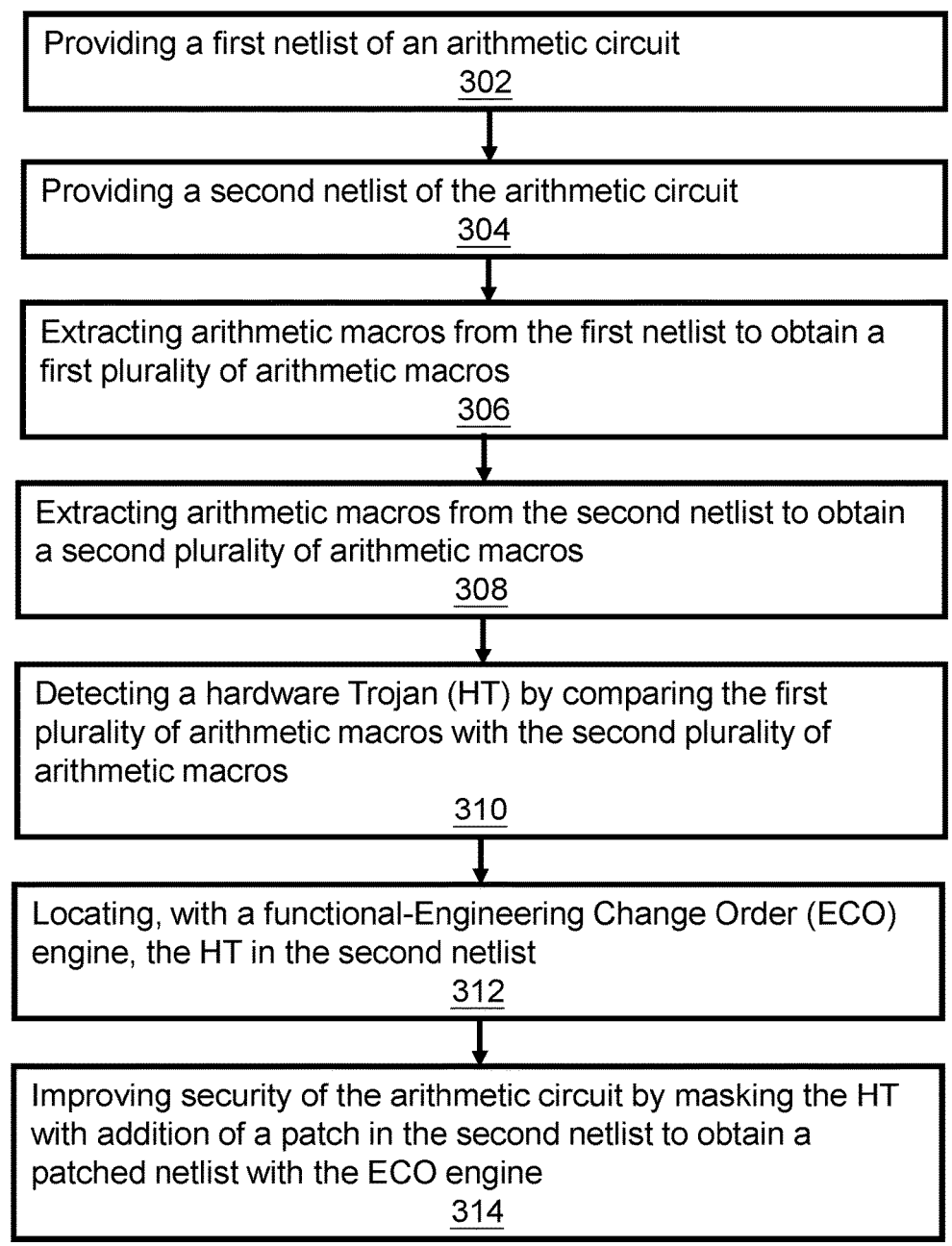
FIG. 3 shows a flow diagram illustrating an example method in accordance with an example embodiment.

FIG. 3 shows a flow diagram in accordance with an example embodiment. The flow diagram 300 illustrates an example method that is executed by a computer that incorporates software or an apparatus that incorporates such computer. The computer includes electronic devices such as a computer system or electronic system, wearable electronic devices, servers, portable electronic devices, handheld portable electronic devices, and hardware (e.g., a processor, processing unit, digital signal processor, controller, memory, etc.).

The example method, when executed by the computer, solves one or more existing technical problems as stated above in circuit industry by improving effectiveness and efficiency (such as reduced runtime complexity) for circuit design. The example method also improves performance of the computer that executes the example method by consuming less resource such as memory, processor, and network usage such as bandwidth.

Block 302 states providing a first netlist of an arithmetic circuit.

For example, the first netlist is an originally specified (golden or correct) netlist that conforms to a customer or person's plan or proposed specification. By way of example, the first netlist is a gate-level (GTL) netlist that is synthesized from a golden register-transfer level (RTL) circuit.

Block 304 states providing a second netlist of an arithmetic circuit.

For example, the second netlist is an examined netlist. By way of example, the second netlist is HT-tempered or injected, for example, by a spy or an attacker. To improve circuit security, the second netlist is examined to detect and mask or remove one or more HTs or bugs that are maliciously inserted or injected.

Block 306 states extracting arithmetic macros from the first netlist to obtain a first plurality of arithmetic macros. Block 308 states extracting arithmetic macros from the second netlist to obtain a second plurality of arithmetic macros.

By way of example, a macro or operator macro is defined to be a block of logic which is a building component in a circuit (e.g. an IC) such as adders, multipliers, multiplexers (MUX) or a formula such as (A+8)× C.

In an example embodiment, example reverse engineering (RE) techniques are applied to extract and compare all arithmetic macros such as adders and multipliers with their formula forms. The arithmetic macros are often constructed by a number of elementary components "1-bit adders" which include 1-bit half adders (HA) and/or 1-bit full adders (FA) in specific styles. The reverse engineering technique first identifies all these elementary components from the whole circuit. Secondly, RE builds a 1-bit adder graph where the output of one adder is the input of another adder. The functionality or formula of the arithmetic logics is obtained from the style of the built adder graph.

Figure 4A:
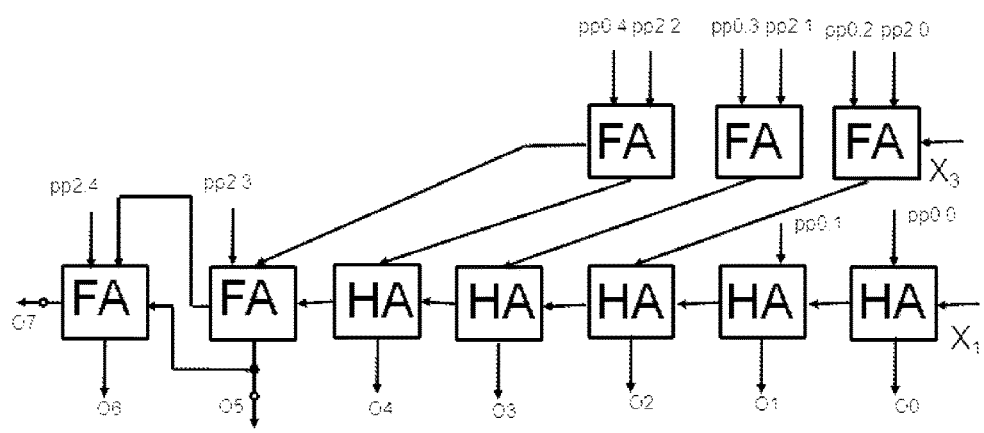
FIG. 4A shows a graph illustrating a multiplier in accordance with an example embodiment.
Figure 4B:
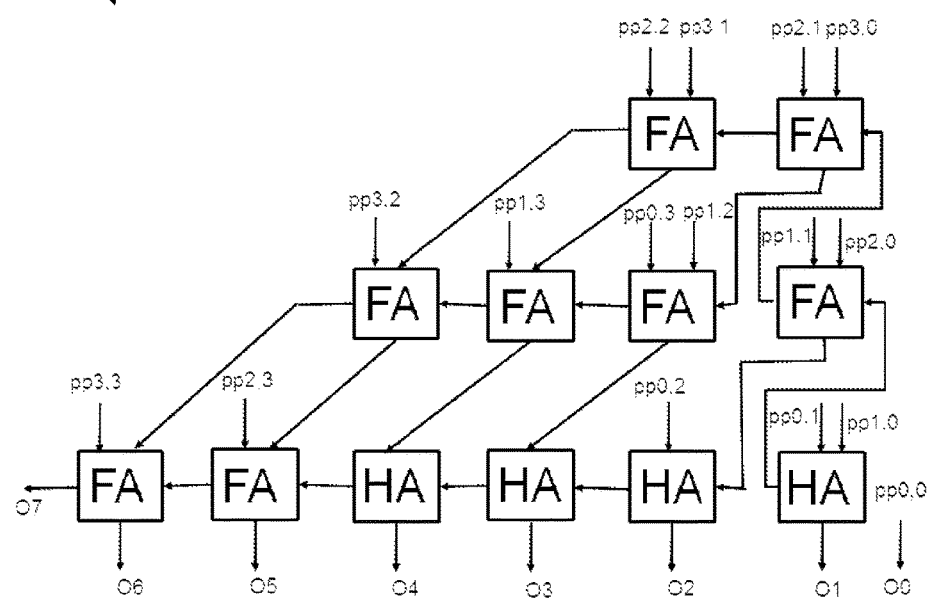
FIG. 4B shows a graph illustrating a multiplier in accordance with an example embodiment.

By way of example, arithmetic components (such as an adder and a multiplier) are implemented in a number of styles such as carry-look ahead adder (CLA), Ripple, Booth and Non-Booth which are constructed by 1-bit adders. For example, FIGS. 4A-4B show two graphs in accordance with an example embodiment. The graph in FIG. 4A is an illustrative multiplier 410, and the graph in FIG. 4B is an illustrative multiplier 420, wherein FA represents a 1-bit full adder and HA represents a 1-bit half adder. As illustrated, the multiplier 410 and the multiplier 420 share some common structural units (such as 1-bit adders).

In an example embodiment, all 1-bit adders including their connections are extracted firstly. A 1-bit full adder has 3 input signals (e.g. a, b and c), and 2 output signals (e.g. sum and carry (also called co)). The functionality of a 1-bit full adder is as follows:

$$FA_{sum} = a \otimes b \otimes c$$

$$FA_{co} = a\&b + b\&c + a\&c \quad (1)$$

where "$\otimes$" is also called "XOR" operation means Boolean "exclusive or" function, "+" means Boolean "or" function, and "&" means Boolean "and" function.

A 1-bit half adder has two input signals (e.g. a and b), and 2 output signals (e.g. sum and carry (also called co)). The functionality of a 1-bit half adder is as follows:

$$FA_{sum} = a \otimes b$$

$$FA_{co} = a\&b$$

By way of example, both an adder and a multiplier are composed of one or more 1-bit adders. For example, the third output of a 4-bit multiplier in Non-Booth style is expressed as:

$$z2 = HAsum(FAsum(a0b2, a1b1, a2b0), HAco(a0b1, a1b0)) \quad (2)$$
$$= a0b2 \otimes a1b1 \otimes a2b0 \otimes HAco(a0b1, a1b0)$$

As an example, the fourth output of a 4-bit multiplier in Non-Booth style is expressed as:

$$z_3 = HA_{sum}(FA_{sum}(FA_{sum}(a_0b_3, a_1b_2, a_2b_1), a_3b_0, FA_{co}), HA_{co} \quad (3)$$
$$= a0b3 \otimes a1b2 \otimes a2b1 \otimes a3b0 \otimes HAco \otimes FAco$$

where $FA_{co}$ and $HA_{co}$ are carry out signals from other adders

In an example embodiment, to figure out 1-bit adder graph, all 1-bit adders are firstly identified. To figure out 1-bit adders, all 2-input single-output sub circuits whose function is exclusive or (XOR) are firstly identified. Then one or more XOR trees which contain multiple 2-input XOR sub circuits and where an input of a first XOR sub circuit is an output of a second XOR sub circuit are identified. Inputs of the one or more XOR trees are either bit products of adders and multipliers or carry signals of internal 1-bit adders. On basis of the one or more XOR trees, carry signals are deduced and the one or more XOR trees are connected to form or create a XOR forest. As an example, the XOR forest is considered as a 1-bit adder graph. Construction of a 1-bit adder graph in accordance with an example embodiment is shown in FIG. 5.

Figures 5, 6:
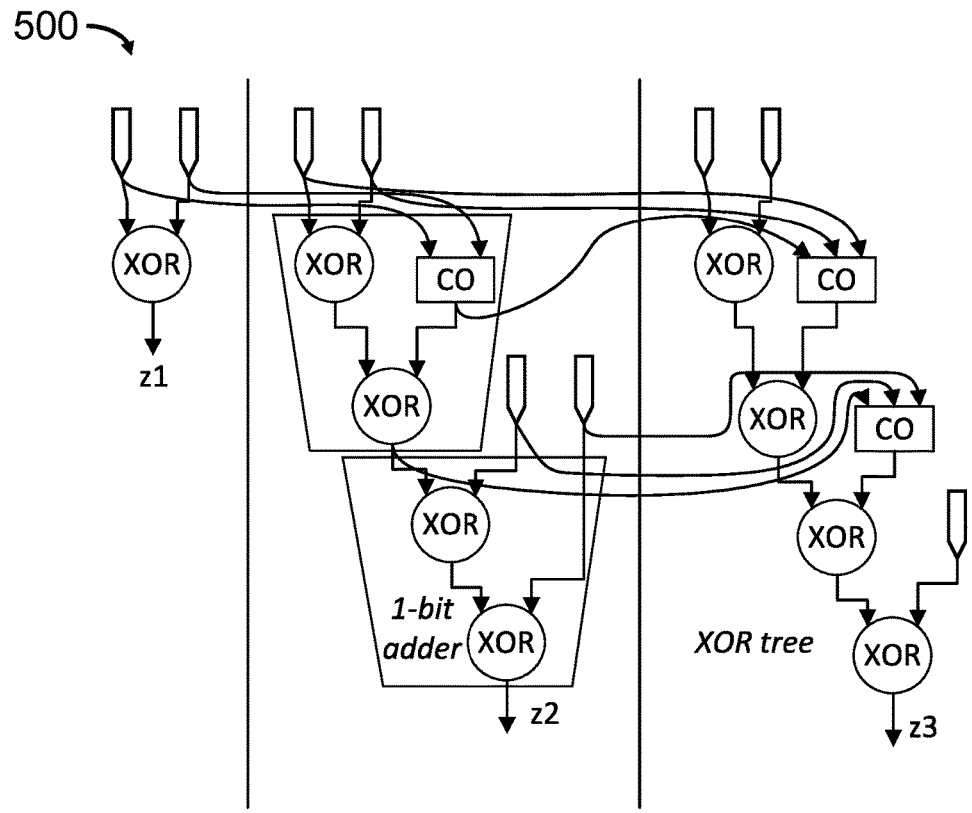
FIG. 5 shows construction of an XOR forest in accordance with an example embodiment.
FIG. 6 shows a table illustrating example reverse engineering in accordance with an example embodiment.

FIG. 6 shows a table illustrating reverse engineering in accordance with an example embodiment. The example method illustrated in the table 600 includes identifying or determining a plurality of 2-input XOR sub-circuits, building a plurality of XOR trees based on that an output of one XOR operation is an input of another XOR operation, determining carry signals of internal 1-bit adders from the plurality of XOR trees and connecting the plurality of XOR trees to form an XOR forest such as 1-bit adder graph such that one or more 1-bit adder graphs are obtained, and determining arithmetic functions and arithmetic boundaries for each of the one or more XOR forests such that a plurality of arithmetic macros are extracted. In an example embodiment, after the network of 1-bit-adders (such as a XOR forest) is formed or built, arithmetic functions such as additions, subtractions and multiplications are determined with the XOR forest. A complex arithmetic logic (e.g. combination of adders and multipliers (such as (a+b)×c, a×b+c×d, etc.)) is built or determined bottom up.

Return back to FIG. 3, Block 310 states detecting a HT by comparing the first plurality of arithmetic macros with the second plurality of arithmetic macros.

In an example embodiment, the process as stated in Block 310 is considered as global HT locating because it globally determine which one or more areas HTs are located. In another example embodiment, to improve efficiency of locating one or more HTs globally, a trimming technique or process is applied.

By way of example, with trimming treatment or technique, equivalent sub-circuit pairs or areas are identified and stripped from a circuit, and all HTs only exist or locate inside the non-equivalent sub-circuit areas. As an example, if a first part of a first circuit and a second part of a second circuit are equivalent sub-circuit pairs, the first part and the second part have same function, or they are functionally equivalent. If the first part and the second part have different function, they are functionally non-equivalent and are not equivalent sub-circuit pairs. As another example, the first plurality of arithmetic macros consist of part A1 and part B1, and the second plurality of arithmetic macros consist of part A2 and part B2. The part A1 and the part A2 are functionally equivalent, and the part B1 and the part B2 are functionally non-equivalent. As an example, the part A2 is trimmed out from the second plurality of arithmetic macros such that a HT is determined to be located in the part B2 of the second plurality of arithmetic macros.

Figure 7A:
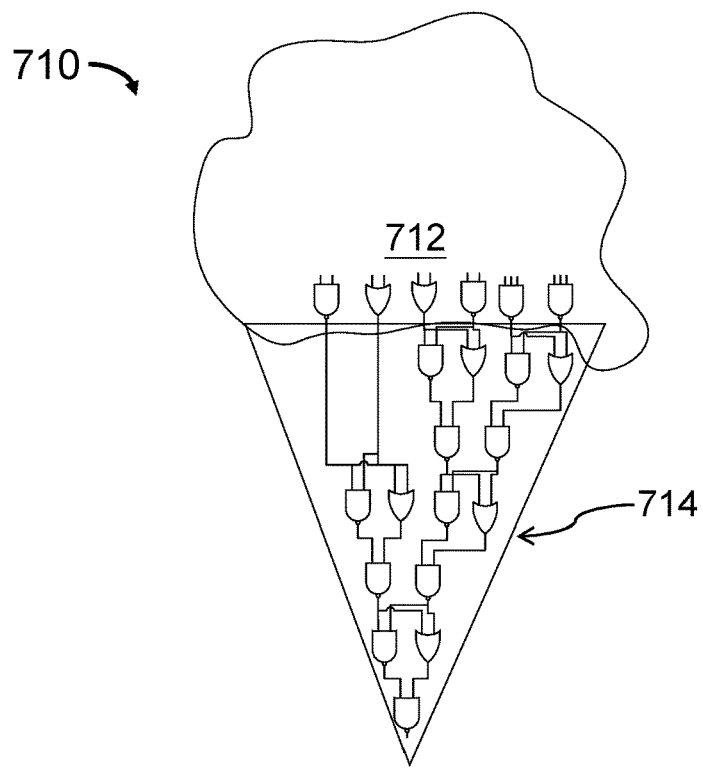
FIG. 7A shows a graph illustrating an examined netlist in accordance with an example embodiment.
Figure 7B:
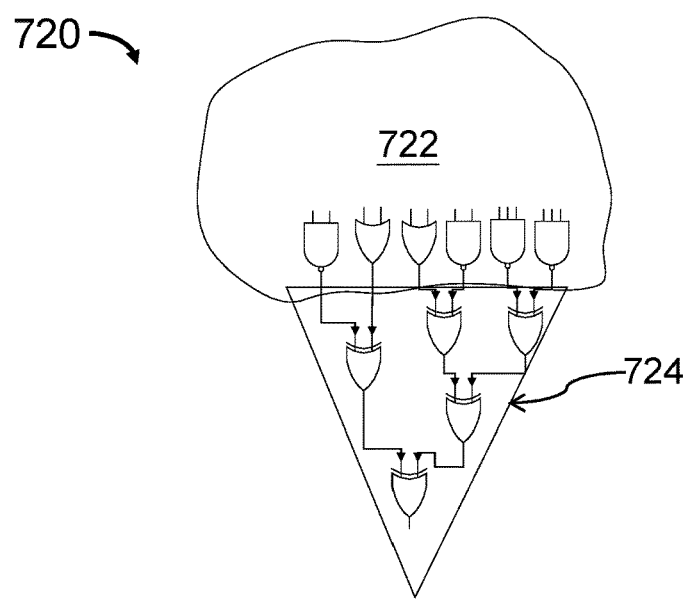
FIG. 7B shows a graph illustrating a golden netlist in accordance with an example embodiment.
Figure 7C:
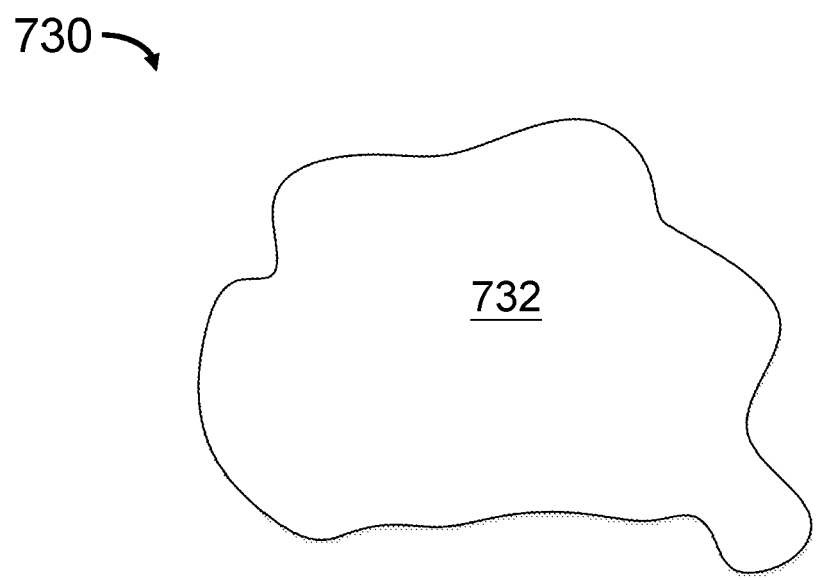
FIG. 7C shows a graph illustrating a trimmed netlist in accordance with an example embodiment.

By way of example, FIG. 7A-7C show graphs illustrating a trimming process in accordance with example embodiment. FIG. 7A shows an examined netlist 710 (or a second netlist) that is HT injected. The examined netlist 710 includes a part 714 that has a 6-XOR sub-circuit (i.e. implementing a 6-input XOR function) and a part 712 indicating other part of the examined netlist 710. FIG. 7B shows a golden or correct netlist 720 (or a first netlist) that is originally specified. The golden netlist 720 includes a part 724 that has a 6-XOR sub-circuit and a part 722 indicating other part of the golden netlist 720. Thus, the part 714 and the part 724 have same function or are functionally equivalent but with different implementation style.

As shown in FIG. 7C, an equivalent pair, the part 714 and the part 724, is trimmed out or stripped away from respective netlist to obtain a trimmed netlist 730. In an example embodiment, a trimming or stripping process is iteratively performed to minimize the non-equivalent circuit part. In another example embodiment, a trimming or stripping process is iteratively performed until no equivalent sub-circuit pair or equivalent pair is found between the examined netlist 710 and the golden netlist 720. Return back to FIG. 3, Block 312 states locating, with a functional-Engineering Change Order (ECO) engine, the HT in the second netlist.

By way of example, a functional-ECO engine or technique is applied to locating and masking HTs.

Block 314 states improving security of the arithmetic circuit by masking the HT with addition of a patch in the second netlist to obtain a patched netlist with ECO engine.

By way of example, functional ECO engine denotes a set of primary inputs (PIs) in a circuit as a set of Boolean variables $X=\{x_1, \ldots, x_n\}$. Functions of primary outputs (POs) in an examined design or specification and a golden or correct specification are denoted by $F(X)=\{f_1(X), f_2(X), \ldots, f_m(X)\}$ and $G(X)=\{g_1(X), g_2(X), \ldots, g_m(X)\}$ respectively.

For an examined and golden function pair, $f_i$ and $g_i$, a diff-set characterizes a set of input assignments for which the functions $f_i$ and $g_i$ have opposite values and is defined as follows:

$$\text{diff}_i(X)=f_i(X)\oplus g_i(X) \qquad (4)$$

The functional ECO engine minimizes the diff-set for every function pair by adding patch logics/circuits incrementally until all diff-sets are empty, which indicates that the examined function and golden function are equivalent and the HT is eliminated. In an example embodiment, a patch logic is inserted into the circuit to minimize the diff-set.

For example, for an internal signal r within the circuit where the patch logic is to be inserted, assume function of r is $t(X)$, and a PO ($PO_i$ driven by r whose function is $f_i$), $f_i(X,r)$ is expressed in terms X and r, then the care-set for r is defined as follows:

$$\text{care}_i^r=f_i(X,t(X))\oplus f_i(X,\neg t(X)) \qquad (5)$$

A care-set characterizes a set of input assignments for which any change at signal r can be observed at the output function $f_i$. In an example embodiment, the care-set overlaps with the diff-set and is divided into two partitions:
 (i) care-out-diff: including Boolean expression resulting in 1 for the output (min-terms) in the care-set but not in the diff-set, $\text{care}_i^r \wedge \neg \text{diff}_i$; and
 (ii) care-in-diff: including min-terms in both the care-set and diff-set, $\text{care}_i^r \wedge \text{diff}_i$.

By way of example, changing values of the min-terms in the care-out-diff changes value of $f_i$ and enlarges the diff-set. Hence, the min-terms in the function t is preserved and the following constraint is satisfied by the patch function $p(X)$:

$$p(X)\supseteq t(X) \wedge \text{care}_i^r(X) \wedge \neg \text{diff}_i(X) \qquad (6)$$

On the other hand, in order to minimize the diff-set, t's min-terms inside the care-in-diff is evaluated to the opposite values:

$$p(X)\supseteq \neg t(X) \wedge \text{care}_i^r(X) \wedge \text{diff}_i(X) \qquad (7)$$

Therefore, if $p(X)$ and diff-set satisfy the following condition, $$p(X)\supseteq \neg t(X) \wedge \text{diff}_i(X) \qquad (8)$$

which implies that $$\text{care}_i^r(X)\supseteq \text{diff}_i(X) \qquad (9)$$

then $p(X)$ completely empties $\text{diff}_i(X)$ and accomplishes the golden function $g_i$.

Specifically, for example, when $r=PO_i$, $\text{care}_i^r(X)\supseteq \text{diff}_i(X)$ is always satisfied, which implies that a patch function can be found that satisfies constraint Equation (8), which completely empties $\text{diff}_i(X)$ and accomplishes golden function $g_i$ (e.g, $g_i$ is directly used as a patch function).

Figure 8A:
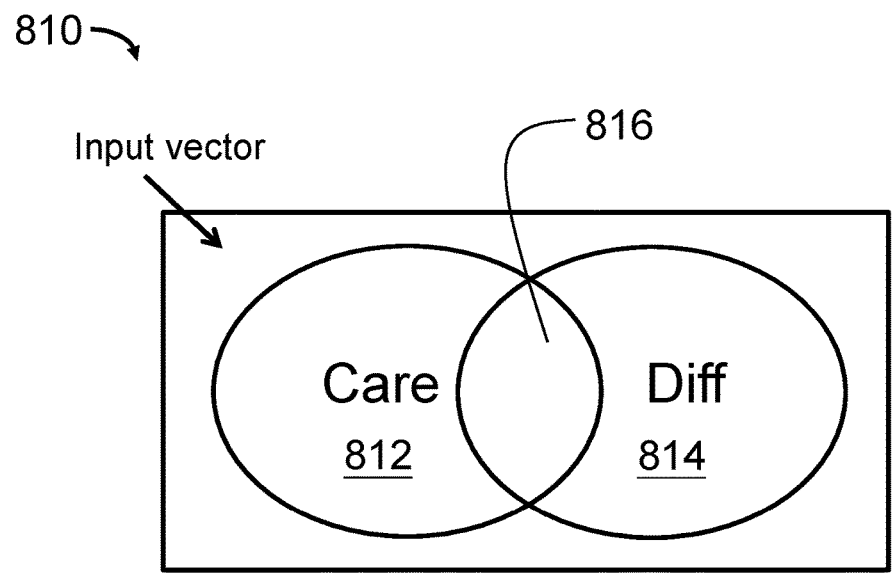
FIG. 8A shows a graph illustrating patch creation before patching in accordance with an example embodiment.
Figure 8B:
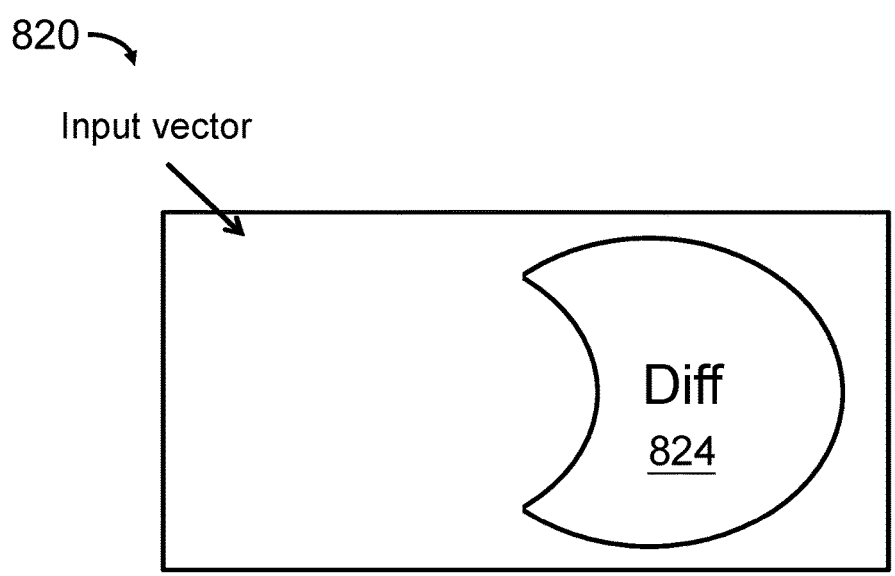
FIG. 8B shows a graph illustrating patch creation after patching in accordance with an example embodiment.

FIGS. 8A-8B show graphs illustrating patch function creation in accordance with an example embodiment. FIG.

8A shows a graph 810 before patching. The graph 810 includes a care-set 812 and a diff-set 814 that have an overlap 816 (i.e. care-in-diff). The care-set 812 with the care-in-diff 816 excluded is care-out-diff. FIG. 8B shows a graph 820 after patching. The graph 820 includes a diff-set 824 that is smaller than the diff-set 814. The diff-set is reduced in size after generation of a patch.

By way of example, constraints Equation (6-8) are considered when creating patch or patch functions. If the signal r only drives a single output, the corresponding patch function must satisfy both Equation (6) and Equation (7). In an example embodiment, to enhance possibility of creating an effective patch while avoiding exhaustive searches, the patch is one of conservative patch and aggressive patch.

Figure 9A:
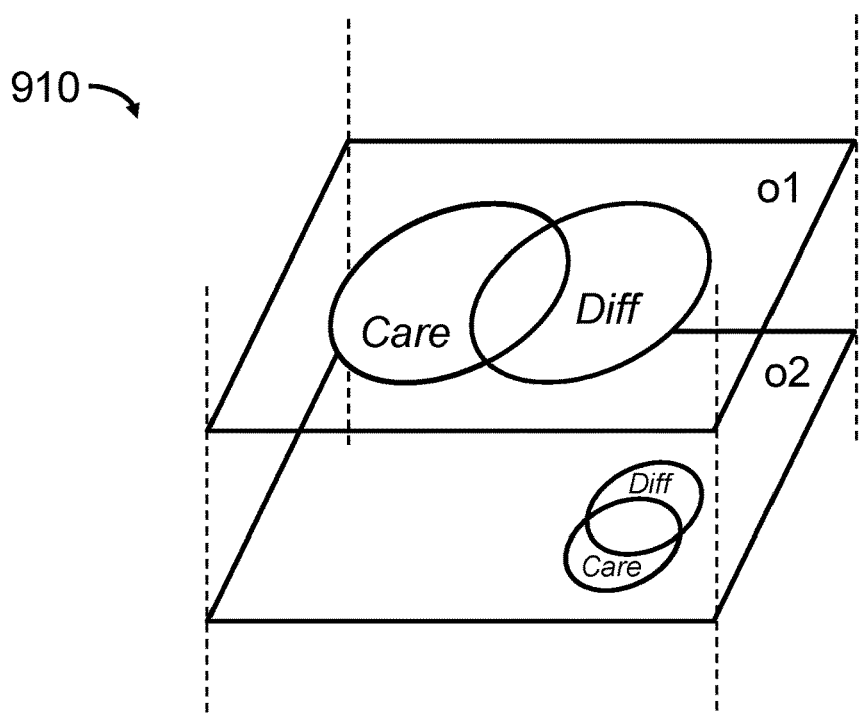
FIG. 9A shows a graph illustrating conservative patch creation before patching in accordance with an example embodiment.
Figure 9B:
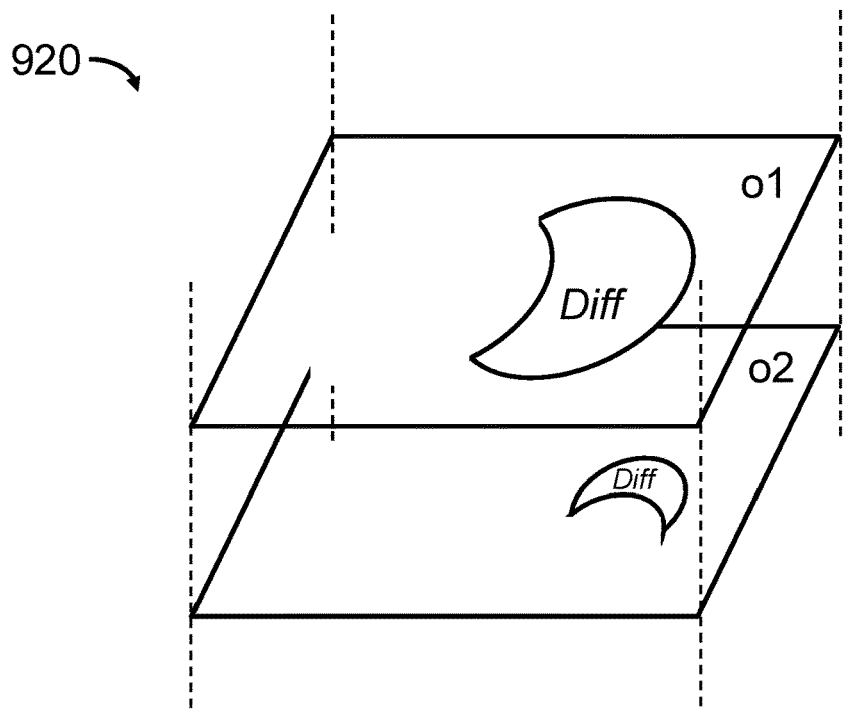
FIG. 9B shows a graph illustrating conservative patch creation after patching in accordance with an example embodiment.

FIGS. 9A-9B show graphs illustrating conservative patch in accordance with an example embodiment. FIG. 9A shows a graph 910 illustrating conservative patch creation before pathing. FIG. 9B shows a graph 920 illustrating conservative patch creation after pathing.

In the conservative patch or strategy, a patch at signal r guarantees that no diff-set of the Primary Out (PO) is worsened. Thus constraint Equation (6) is satisfied for all POs. By way of example, a subset of POs is selected from the PO set $\{PO_1, PO_2, \ldots, PO_m\}$. The subset $\{PO_{i1}, PO_{i2}, \ldots, PO_{il}\}$ is called an improved PO set. A created patch at r cuts down the diff-set of POs in the improved PO set. In other words, for each PO in this set, constraint Equation (7) is satisfied.

By way of example, the selection of POs and the size of the improved PO set is adjusted dynamically as the logic patching proceeds. The smaller the improved PO set size is, the easier to create a satisfying patch.

As shown in FIGS. 9A-9B, a conservative patch is created at an internal signal driving two primary outputs. The diff-sets of both outputs are minimized as shown.

Figure 10A:
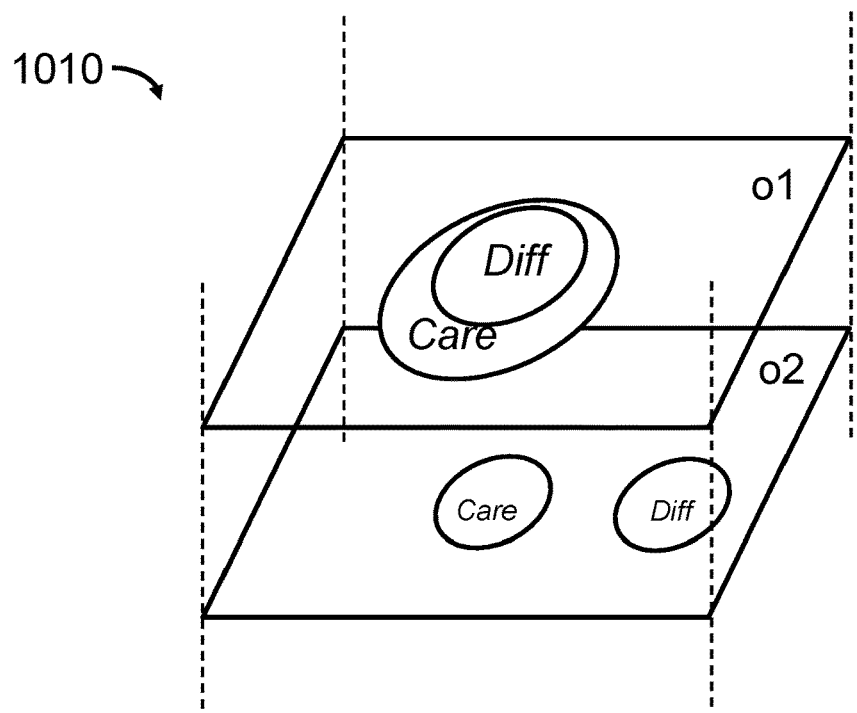
FIG. 10A shows a graph illustrating aggressive patch creation before patching in accordance with an example embodiment.
Figure 10B:
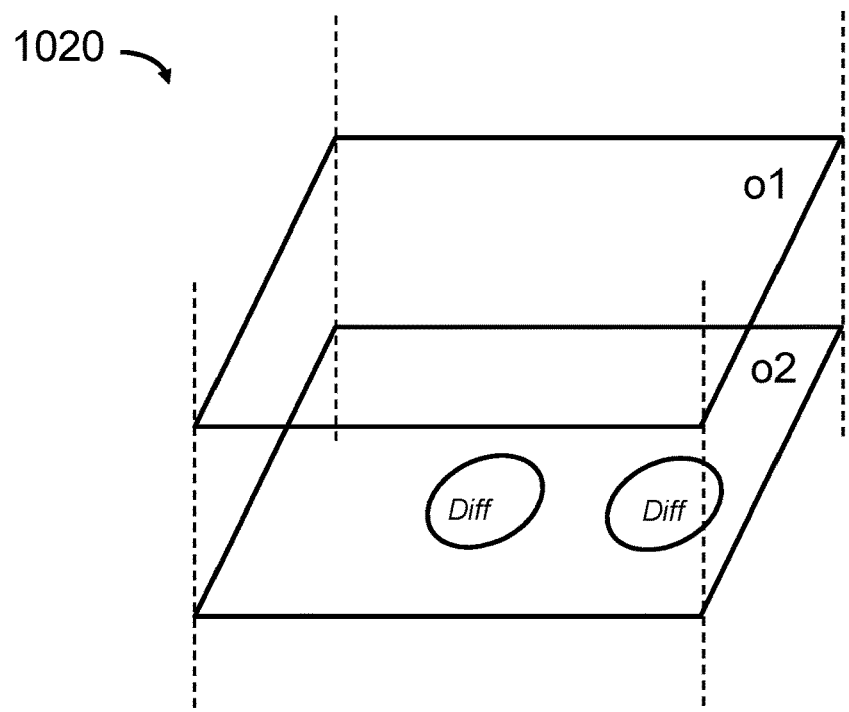
FIG. 10B shows a graph illustrating aggressive patch creation after patching in accordance with an example embodiment.

FIGS. 10A-10B show graphs illustrating aggressive patch in accordance with an example embodiment. FIG. 10A shows a graph 1010 illustrating aggressive patch creation before pathing. FIG. 10B shows a graph 1020 illustrating aggressive patch creation after pathing.

By way of example, diff-sets of some POs are improved while diff-sets of some other POs are ignored. In an example, a PO set is divided into three subsets:
(i) Ignored Set: POs in the set is not considered during a patching process, and in an example embodiment, diff-sets of such POs become worse after patching.
(ii) No Change Set: diff-sets of POs in this set do not become worse. In an example embodiment, diff-sets of POs in this set do not improve either. Constraint Equation (6) is satisfied for every PO in this set. The POs that have been fixed in previous iterations (e.g. their diff-sets are already empty) are assigned to this set, to such that they do not become unfixed again.
(iii) Improved Set: diff-sets of POs in this set are improved by a created patch.
Both constraints Equation (6) and Equation (7) are satisfied. Furthermore, for at least one PO in this set, constraint Equation (8) is satisfied, which implies that the patch created is able to fix at least one PO completely.

As shown in FIGS. 10A-10B, the diff-set of o1 can be completely eliminated while the diff-set of o2 is enlarged.

In an example embodiment, example methods include improving efficiency of locating the HT in a netlist with a functional-Engineering Change Order (ECO) engine. As an example, a conservative patch candidate and an aggressive patch candidate are generated, and then a patch candidate with a smaller size between the conservative patch candidate and the aggressive patch candidate is chosen or selected as a real patch.

In some example embodiments, a patch is improved by optimizing the patch with logic rewiring treatment to minimize size of the patch, which have many benefits such as helping reduce timing perturbation for a target circuit or chip. As an example, a patch optimization process or treatment includes an Add-First rewiring transformation and a Cut-First rewiring transformation.

Figure 11A:
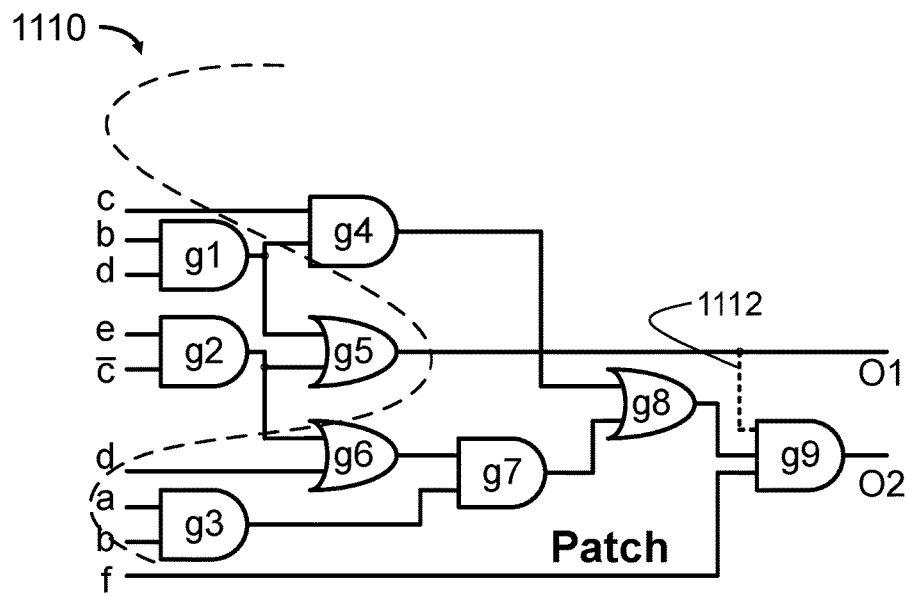
FIG. 11A shows a graph illustrating a patch before an Add-First rewiring transformation in accordance with an example embodiment.
Figure 11B:
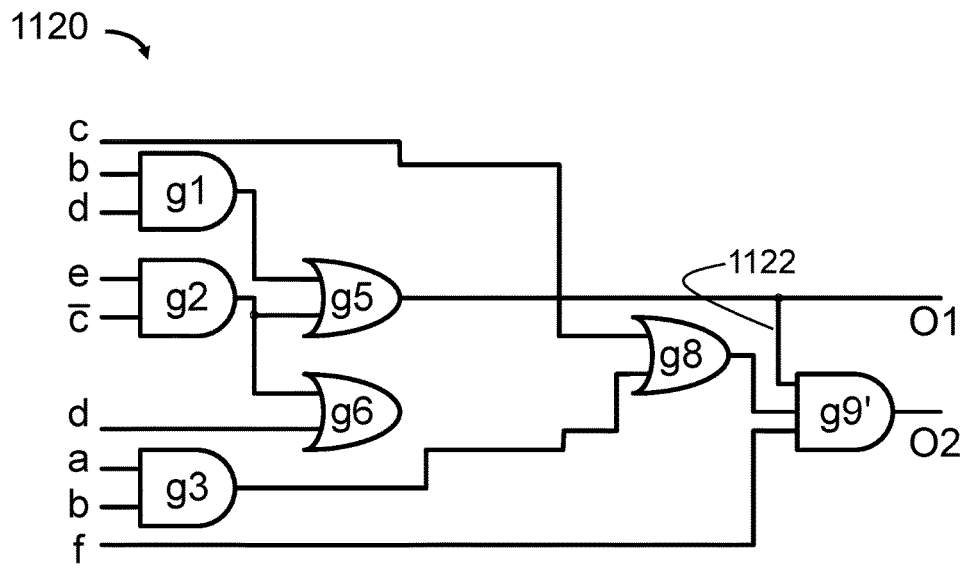
FIG. 11B shows a graph illustrating a patch after an Add-First rewiring transformation in accordance with an example embodiment.

FIGS. 11A-11B show graphs illustrating an Add-First rewiring transformation in accordance with an example embodiment. The graph 1110 in FIG. 11A shows a patch before an Add-First rewiring transformation, and the graph 1120 in FIG. 11B shows a patch after an Add-First rewiring transformation.

As shown, for Add-First rewiring transformation, a wire or redundant wire 1112 is added into a patch circuit first (e.g. a wire from g5 to g9 in the figure). Then several wires and consequentially several gates (e.g. g4, g6, and g7) become redundant and are thus removable or can be removed as shown in FIG. 11B. As shown, the optimized patch is minimized with reduced size. The detail implementation of the rewiring transformation is described in paper "Combinational and Sequential Logic Optimization by Redundancy Addition and Removal" written by L. A. Entrena and K.-T. Cheng, published in IEEE transaction on Computer-Aided Design on 1995.

Figure 12A:
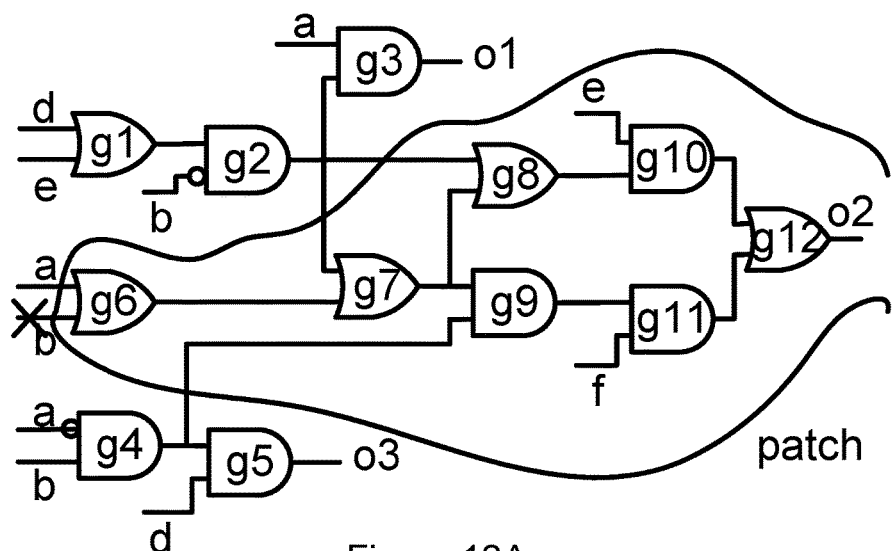
FIG. 12A shows a graph illustrating a patch before a Cut-First rewiring transformation in accordance with an example embodiment.
Figure 12B:
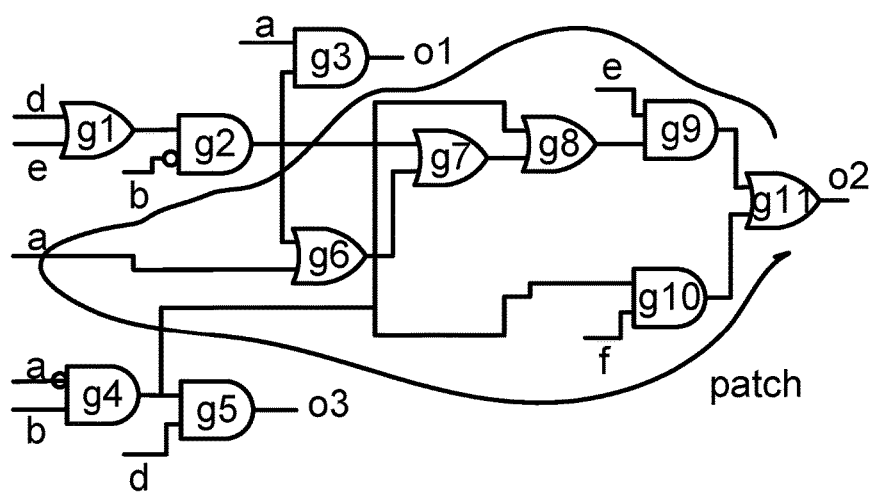
FIG. 12B shows a graph illustrating a patch after a Cut-First rewiring transformation in accordance with an example embodiment.

FIGS. 12A-12B show graphs illustrating a Cut-First rewiring transformation in accordance with an example embodiment. The graph 1210 in FIG. 12A shows a patch before a Cut-First rewiring transformation, and the graph 1220 in FIG. 12B shows a patch after a Cut-First rewiring transformation.

As shown, a wire from b to g6 is removed first, which causes observable errors propagating from g6 to o2. By an error cancellation analysis, all errors are correctable by adding additional logics at g8 and g9. The corrected patch requires fewer gates and wires as shown in FIG. 12B. The implementation of Cut-First rewiring transformation is described in paper "ECR: a low complexity generalized error cancellation rewiring scheme", written by Xiao Qing Yang, Tak-Kei Lam and Yu-Liang Wu, published in Proceedings of the 47th Design Automation Conference on 2010.

By way of example, for a serial of Internet of Things (IoT) chips with a few minor differences to be designed, given that each chip requires 3 months to complete a P&R process, existing methods requires 3+3=6 months to complete design of two chips. In contrast, example methods in accordance with some example embodiments complete the same task in in 3 months+10 minutes.

FIG. 13 shows a table illustrating characteristics of benchmarks in accordance with an example embodiment. In the table 1300, in the column of "Style", B represents Booth multiplier, and NB represents Non-Booth multiplier. As shown, besides multiplication, some more complicated arithmetic functions (see the column of "Extracted arithmetics" in the table 1300) also exist in the benchmarks.

In the table 1300, the first column is the name of a case suite. Each suite includes 13 benchmarks which implement similar arithmetic functions but with different operands' bitwidths. Example extracted arithmetic logics as well as their design styles (in Booth or in Non-Booth) and operands' bit-widths are shown at columns 3-5. Example methods extract most (97%) of the benchmarks with only suites ut36 and hid10 failed. With the arithmetic logics successfully extracted, example formal verification techniques such as example SAT solvers are employed or called for the extracted circuits to detect presence of one or more HTs.

By way of example, each of these benchmarks is a gate-level (GTL) combinational circuit including arithmetic logics. Example reverse engineering techniques are applied to locate the arithmetic logics from flatten circuits (like "sea of gates") without knowing of the component input/output (I/O) and boundaries. The table 1300 shows that the formulae are successfully extracted with example methods.

FIG. 14 shows a table illustrating example methods in accordance with an example embodiment.

In the table 1400, the first three columns show benchmark information. Each benchmark has two circuits g1 and g2, which have logic differences. As an example, g1 is a HT-tampered or examined circuit and g2 is the golden or correct circuit. The next 2 columns show patch size in gates and runtime with example methods or schemes. Last 2 columns show the patch size in gates and runtime using two example methods (i.e. Example method 1 and Example method 2). As shown, example methods generate patches 40% smaller with central processing unit (CPU) time reduced by 86%.

Figure 15:
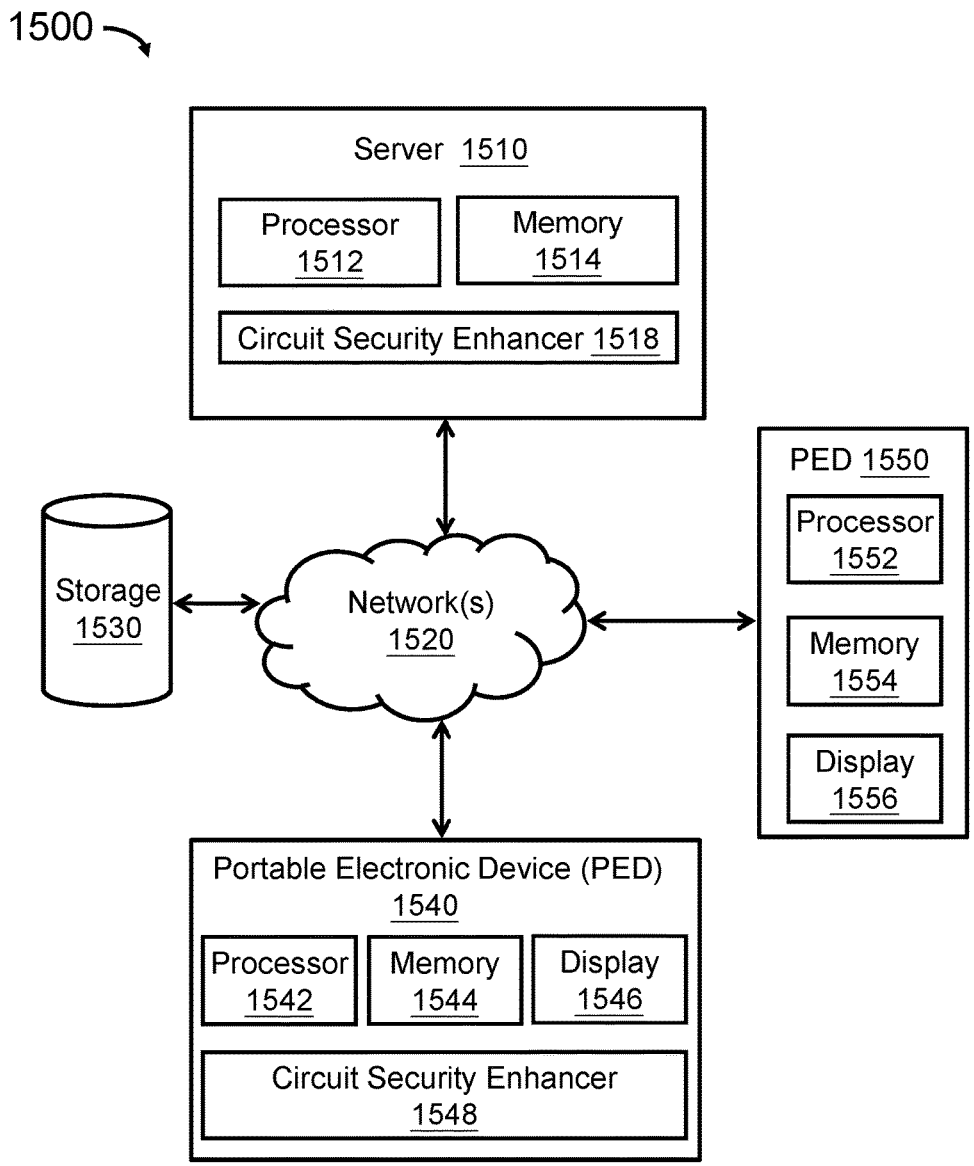
FIG. 15 shows a computer system in accordance with an example embodiment.

FIG. 15 shows a computer system or electronic system in accordance with an example embodiment. The computer system 1500 includes one or more computers or electronic devices (such as one or more servers) 1510 that includes a processor or processing unit 1512 (such as one or more processors, microprocessors, and/or microcontrollers), one or more components of computer readable medium (CRM) or memory 1514, and a circuit security enhancer 1518.

The memory 1514 stores instructions that when executed cause the processor 1512 to execute a method discussed herein and/or one or more blocks discussed herein. The circuit security enhancer 1518 is example of specialized hardware and/or software that assist in improving performance of a computer and/or execution of a method discussed herein and/or one or more blocks discussed herein. Example functions of a circuit security enhancer are discussed in connection with FIG. 3.

In an example embodiment, the computer system 1500 includes a storage or memory 1530, a portable electronic device or PED 1540 in communication over one or more networks 1520.

The storage 1530 can include one or more of memory or databases that store one or more of image files, audio files, video files, software applications, and other information discussed herein. By way of example, the storage 1530 store image, instructions or software application that are retrieved by the server 1510 over the network 1520 such that a method discussed herein and/or one or more blocks discussed herein are executed.

The PED 1540 includes a processor or processing unit 1542 (such as one or more processors, microprocessors, and/or microcontrollers), one or more components of computer readable medium (CRM) or memory 1544, one or more displays 1546, and a circuit security enhancer 1548.

The PED 1540 can execute a method discussed herein and/or one or more blocks discussed herein and display an image or a file (such as a netlist) for review. Alternatively or additionally, the PED 1540 can retrieve files such as images and files and software instructions from the storage 1530 over the network 1520 and execute a method discussed herein and/or one or more blocks discussed herein.

In an example embodiment, the computer system 1500 includes a PED 1550 that includes a processor or processing unit 1552 (such as one or more processors, microprocessors, and/or microcontrollers), one or more components of computer readable medium (CRM) or memory 1554, and one or more displays 1556.

By way of example, the PED 1550 communicates with the server 1510 and/or the storage 1530 over the network 1520 such that a method discussed herein and/or one or more blocks discussed herein is executed either by the server 1510 and results are sent back to the PED 1550 for output, storage and review.

The network 1520 can include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices can couple together via one or more wires, such as a direct wired-connection. As another example, electronic devices can communicate directly through a wireless protocol, such as Bluetooth, near field communication (NFC), or other wireless communication protocol.

In some example embodiments, the methods illustrated herein and data and instructions associated therewith, are stored in respective storage devices that are implemented as non-transitory computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed a processor, controller, and other hardware discussed herein. Furthermore, blocks and/or methods discussed herein can be executed automatically with or without instruction from a user.

The methods in accordance with example embodiments are provided as examples, and examples from one method should not be construed to limit examples from another method. Figures and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, the term "hardware Trojan" (HT) refers to an unauthorized or unintended alteration, modification, insertion, implantation or inclusion to a circuit. For example, a HT causes malfunction, reduced reliability, confidential information leakage, etc. or combination thereof.

As used herein, the term "arithmetic circuit" refers to a circuit in which one or more parts of the circuit are used to accomplish arithmetic operations such as addition, subtraction, multiplication and any other arithmetic operations.

As used herein, the term "netlist" lists the connectivity between logic gates forming a circuit.

As used herein, the term "macro" or "arithmetic macro" refers to a number of logic primitives or standard cells which compose a component in a circuit (e.g. an IC) such as adders, multipliers, multiplexers (MUX) or a formula such as (A+B)×C, etc.

As used herein, the term "sub circuit" refers to term "macro" and these two terms can be used interchangeably.

As used herein, the term "2-input exclusive-or (XOR) sub circuit" refers to a sub circuit which has 2 input signals and 1 output signal. The functionality of the output signal is the exclusive or function of two input signals.

As used herein, the term "XOR tree" refers to a sub circuit which is composed of one or more 2-input XOR sub circuits and their connections.

As used herein, the term "1-bit adder" refers to 1-bit half adder and/or 1-bit full adder.

As used herein, the term "1-bit half adder" refers to an arithmetic macro which has 2 inputs (e.g. a and b) and 2 outputs (e.g. sum and co). "co" can be also called carry or carry out. The functionality of sum is "exclusive or" function of a and b; the functionality of co is "and" function of a and b.

As used herein, the term "1-bit full adder" refers to an arithmetic macro which has 3 inputs (e.g. a, b, and c) and 2 outputs (e.g. sum and co). "co" can be also called carry or carry out. The functionality of sum is "exclusive or" function of a, b and c; the functionality of co is "majority" function of a, b and c.

As used herein, the term "1-bit adder graph" refers to a sub circuit which is composed of one or more 1-bit adders and their connections.

As used herein, the term "XOR forest" refers to the term "1-bit adder graph" and these two terms can be used interchangeably.

As used herein, the term "reverse engineering (RE)" refers to the process to extract arithmetic macros from a circuit. An RE process comprises identifying 2-input exclusive-or (XOR) sub circuits, XOR trees, 1-bit adders, 1-bit adder graphs, and arithmetic macros.

As used herein, the term "exponential time" refers to running time for an algorithm or a method is upper bounded by $2^{poly(n)}$, where poly(n) is some polynomial in n, wherein n is size of the input for the algorithm.

As used herein, the term "polynomial time" refers to running time for an algorithm or a method is upper bounded by a polynomial expression in the size of the input for the algorithm.

As used herein, the term "linear time" refers to running time for an algorithm or a method increases linearly with the size of the input for the algorithm.

What is claimed is:

1. A method executed by a computer system to detect, locate, and mask a functional hardware Trojan (HT) in an arithmetic circuit to improve circuit security, the method comprising:
providing a first netlist of the arithmetic circuit;
providing a second netlist of the arithmetic circuit, wherein the second netlist is HT tampered;
extracting, by the computer system, arithmetic macros from the first netlist to obtain a first plurality of arithmetic macros;
extracting, by the computer system, arithmetic macros from the second netlist to obtain a second plurality of arithmetic macros;
detecting, by the computer system, the HT by comparing the first plurality of arithmetic macros with the second plurality of arithmetic macros and reducing resource usage of the computer system by trimming out a first part from the second plurality of arithmetic macros that has counterpart in the first plurality of arithmetic macros that performs same function such that the HT is detected to be located in a second part of the second plurality of arithmetic macros that has no counterpart in the first plurality of arithmetic macros that performs same function;
locating, by the computer system and with a functional-Engineering Change Order (ECO) engine, the HT in the second netlist; and
improving, by the computer system and with the functional-ECO engine, security of the arithmetic circuit by masking the HT with insertion of a patch in the second netlist to obtain a patched netlist such that an associated circuit can be restored in accordance with correct specification and the HT does no harm to the arithmetic circuit.

2. The method of claim 1, wherein the first netlist is a gate-level (GTL) netlist that is synthesized from a register-transfer level (RTL) specification of the arithmetic circuit.

3. The method of claim 1, further comprises, for each of the first netlist and the second netlist of the arithmetic circuit:
identifying, by the computer system, a plurality of 2-input exclusive-or (XOR) sub-circuits;
building, by the computer system and based on that an output of one XOR sub circuit is an input of another XOR sub circuit, a plurality of XOR trees;
determining, by the computer system, carry out signals of 1-bit adders and 1-bit adders from the plurality of XOR trees;
building, by the computer system and connecting the plurality of 1-bit adders, 1-bit adder graph; and
determining, by the computer system, arithmetic functions and arithmetic boundaries for each of the one or more 1-bit adder graph such that a plurality of arithmetic macros are extracted.

4. The method of claim 1, wherein the first plurality of arithmetic macros consist of part A1 and part B1, and the second plurality of arithmetic macros consist of part A2 and part B2, and wherein part A1 and part A2 are functionally equivalent, and part B1 and part B2 are functionally non-equivalent,
wherein the method further comprises:
trimming out, by the computer system, part A2 from the second plurality of arithmetic macros such that the HT is determined to be located in part B2 of the second plurality of arithmetic macros.

5. The method of claim 1, wherein the patch is one of conservative patch and aggressive patch.

6. The method of claim 1, further comprises:
improving, by the computer system, the patch by optimizing the patch with logic rewiring treatment to minimize size of the patch.

7. The method of claim 1, further comprises patch optimization executed by the computer system to minimize size of the patch, wherein the patch optimization includes an Add-First rewiring transformation and a Cut-First rewiring transformation.

8. The method of claim 1, further comprising:
optimizing, by the computer system and with an Add-First rewiring transformation and a Cut-First rewiring transformation, the patch to reduce size of the patch,
wherein the Add-First rewiring transformation includes adding a redundant wire into the patch such that one or more wires and one or more gates in the patch become redundant and removable; and
wherein the Cut-First rewiring transformation includes removing a wire from the patch to generate an error followed by an error correction with one or more logics added such that a resultant patch is generated with fewer gates and wires.

9. A computer system that detects, locates, and masks a hardware Trojan (HT) in an arithmetic circuit to improve circuit security, wherein the arithmetic circuit has a first netlist and a second netlist, and the second netlist is HT tampered, the computer system comprising:
a hardware processor;
a non-transitory computer-readable medium having stored therein instructions that when executed cause the processor to:
extract arithmetic macros from the first netlist to obtain a first plurality of arithmetic macros;
extract arithmetic macros from the second netlist to obtain a second plurality of arithmetic macros;
detect the HT by comparing the first plurality of arithmetic macros with the second plurality of arithmetic macros and reducing resource usage of the computer system by trimming out a first part from the second plurality of arithmetic macros that has counterpart in the first plurality of arithmetic macros that performs same function such that the HT is detected to be located in a second part of the second plurality of arithmetic macros that has no counterpart in the first plurality of arithmetic macros that performs same function;
locate the HT in the second netlist with a functional-Engineering Change Order (ECO) engine; and
improve security of the arithmetic circuit by masking the HT with addition of a patch in the second netlist to obtain a patched netlist such that an associated circuit can be restored in accordance with correct specification and the HT does no harm to the arithmetic circuit.

10. The computer system of claim 9, wherein the instructions when executed further cause the processor to:
Identify a plurality of 2-input exclusive-or (XOR) sub-circuits;
build, based on that an output of one XOR operation is an input of another XOR operation, a plurality of XOR trees;
determine carry out signals of 1-bit adders and 1-bit adders from the plurality of XOR trees;
build, based on the plurality of XOR trees, 1-bit adder graphs; and
determine arithmetic functions and arithmetic boundaries for each 1-bit adder graph such that a plurality of arithmetic macros are extracted.

11. The computer system of claim 9, wherein the first plurality of arithmetic macros consist of part A1 and part B1, and the second plurality of arithmetic macros consist of part A2 and part B2, and wherein part A1 and part A2 are functionally equivalent, and part B1 and part B2 are functionally non-equivalent,
wherein the instructions when executed further cause the processor to:
trim out part A2 from the second plurality of arithmetic macros such that the HT is determined to be located in part B2 of the second plurality of arithmetic macros.

12. The computer system of claim 9, wherein the patch is one of conservative patch and aggressive patch.

13. The computer system of claim 9, wherein the instructions when executed further cause the processor to:
improve the patch by optimizing the patch with logic rewiring treatment to minimize size of the patch.

14. The computer system of claim 9, wherein the instructions when executed further cause the processor to perform patch optimization to minimize size of the patch, wherein the patch optimization includes an Add-First rewiring transformation and a Cut-First rewiring transformation.

15. The computer system of claim 9, wherein the instructions when executed further cause the processor to:
optimize the patch with an Add-First rewiring transformation and a Cut-First rewiring transformation to reduce size of the patch,
wherein the Add-First rewiring transformation includes adding a redundant wire into the patch such that one or more wires and one or more gates in the patch become redundant and removable; and
wherein the Cut-First rewiring transformation includes removing a wire from the patch to generate an error followed by an error correction with one or more logics added such that a resultant patch is generated with fewer gates and wires.

16. A computer-implemented method that improves performance of a computer system to detect, locate, and mask a hardware Trojan (HT) in an arithmetic circuit, the method comprising:
receiving, by the computer system, a first netlist of the arithmetic circuit;
receiving, by the computer system, a second netlist of the arithmetic circuit, wherein the second netlist is HT tampered;
extracting, by the computer system, arithmetic macros from the first netlist to obtain a first plurality of arithmetic macros;
extracting, by the computer system, arithmetic macros from the second netlist to obtain a second plurality of arithmetic macros;
detecting, by the computer system, the HT by comparing the first plurality of arithmetic macros with the second plurality of arithmetic macros and improving performance of the computer system by reducing resource usage of the computer system by trimming out a first part from the second plurality of arithmetic macros that has counterpart in the first plurality of arithmetic macros that performs same function such that the HT is detected to be located in a second part of the second plurality of arithmetic macros that has no counterpart in the first plurality of arithmetic macros that performs same function;
locating, by the computer system, the HT in the second netlist; and
improving, by the computer system, security of the arithmetic circuit by masking the HT with insertion of a patch in the second netlist to obtain a patched netlist such that an associated circuit can be restored in accordance with correct specification and the HT does no harm to the arithmetic circuit.

17. The method of claim 16, further comprises improving performance of the computer system by improving extraction of arithmetic macros that comprises, for each of the first netlist and the second netlist of the arithmetic circuit:
- determining, by the computer system, a plurality of 2-input exclusive-or (XOR) sub-circuits;
- building, by the computer system and based on that an output of one XOR operation is an input of another XOR operation, a plurality of XOR trees;
- identifying, by the computer system, carry out signals of 1-bit adders and 1-bit adders from the plurality of XOR trees;
- building, by the computer system, 1-bit adder graphs by connecting the plurality of XOR trees; and
- determining, by the computer system, arithmetic functions and arithmetic boundaries for each of the one or more 1-bit adder graphs such that a plurality of arithmetic macros are extracted.

18. The method of claim 16, further comprises improving performance of the computer system by improving efficiency of locating the HT in the second netlist with a functional-Engineering Change Order (ECO) engine that comprises:
- generating, by the computer system, a conservative patch candidate;
- generating, by the computer system, an aggressive patch candidate;
- choose, by the computer system, a patch candidate with a smaller size between conservative and aggressive patch candidate as a real patch.

19. The method of claim 16, further comprises:
- improving, by the computer system, the patch by minimizing size of the patch with logic rewiring treatment.

20. The method of claim 16, further comprises:
- improving, by the computer system, patch optimization executed by the computer system by minimizing size of the patch, wherein the patch optimization includes an Add-First rewiring transformation and a Cut-First rewiring transformation.

* * * * *